United States Patent
Yamagata et al.

(12) 
(10) Patent No.: US 6,226,397 B1
(45) Date of Patent: May 1, 2001

(54) IMAGE PROCESSING USING DIFFERENT IMAGE SIZES DEPENDING ON WHETHER THE PROCESSING IS COLOR OR MONOCHROME

(75) Inventors: Shigeo Yamagata; Hiroshi Kaburagi, both of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/895,992

(22) Filed: Jul. 17, 1997

(30) Foreign Application Priority Data

Jul. 22, 1996 (JP) .................................................. 8-192579

(51) Int. Cl.[7] .................................................. G06K 9/00
(52) U.S. Cl. .................................................. 382/162
(58) Field of Search .................................. 358/500, 501, 358/512, 514, 522, 527, 529, 530, 532, 462, 515; 382/162, 168, 167, 319, 164, 302, 303, 304, 176, 210, 254, 260–265, 276, 279; 708/300, 303; 345/116

(56) References Cited

U.S. PATENT DOCUMENTS

| | | | |
|---|---|---|---|
| 5,420,938 | * 5/1995 | Funada et al. | 382/173 |
| 5,477,335 | * 12/1995 | Tai | 358/298 |
| 5,572,599 | * 11/1996 | Tse | 382/162 |
| 5,581,359 | 12/1996 | Kaburagi et al. | 358/298 |

* cited by examiner

*Primary Examiner*—Joseph Mancuso
*Assistant Examiner*—F. E. Cooperrider
(74) *Attorney, Agent, or Firm*—Fitzpatrick, Cella, Harper & Scinto

(57) ABSTRACT

An image processor includes spatial filters which execute parallel processing in units of component data of image data made up of a plurality of component data, and an original image color determination unit selects if input image data from a color image input unit is to be processed as a monochrome or color image. When it is selected that the input image data is to be processed as a monochrome image, the processing operations of the spatial filters for the image data are controlled to be executed stepwise.

56 Claims, 19 Drawing Sheets

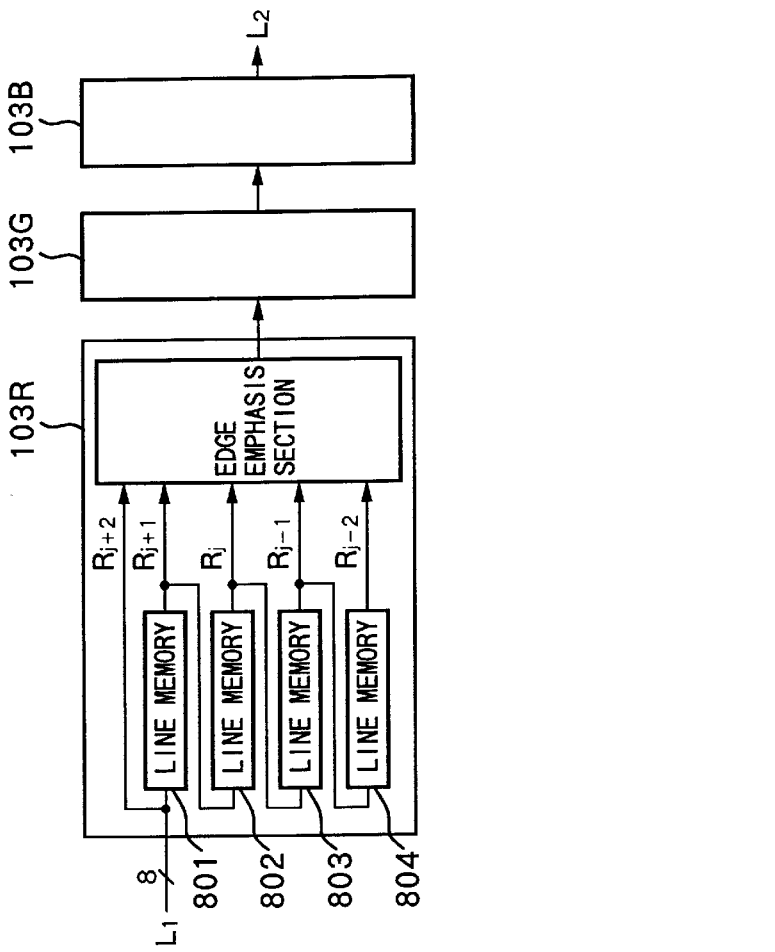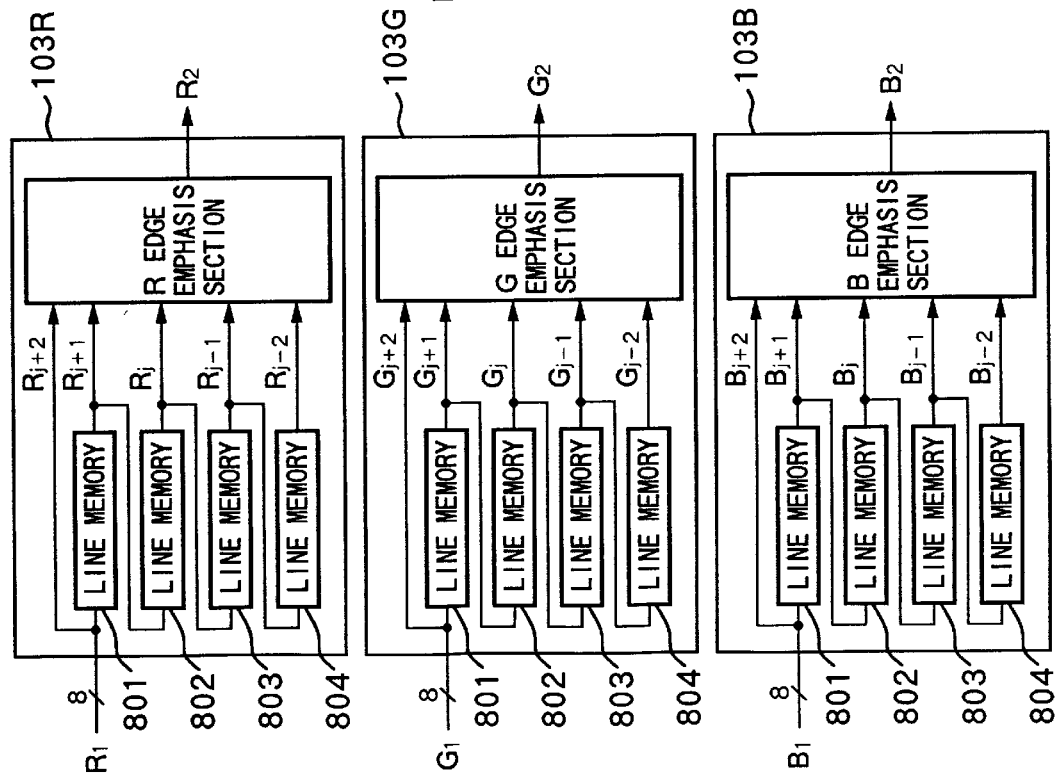

FIG.10

| -12 | -37 | -39 | -37 | -12 |
|---|---|---|---|---|
| -37 | 9 | 71 | 9 | -37 |
| -39 | 71 | 180 | 71 | -39 |
| -37 | 9 | 71 | 9 | -37 |
| -12 | -37 | -39 | -37 | -12 |

601 *1/128

CHARACTER SPATIAL
FILTER COEFFICIENT

| -4 | -10 | -9 | -10 | -4 |
|---|---|---|---|---|
| -10 | 8 | 34 | 8 | -10 |
| -9 | 34 | -36 | -34 | -9 |
| -10 | 8 | 34 | 8 | -10 |
| -4 | -10 | -9 | -10 | -4 |

602 *1/128

IMAGE SPATIAL
FILTER COEFFICIENT

FIG.11

| 0 | -2 | -9 | -13 | -9 | -2 | 0 |
|---|---|---|---|---|---|---|
| -2 | -17 | -27 | -24 | -27 | -17 | -2 |
| -9 | -27 | 17 | 70 | 17 | -27 | -9 |
| -13 | -24 | 70 | 172 | 70 | -24 | -13 |
| -9 | -27 | 17 | 70 | 17 | -27 | -9 |
| -2 | -17 | -27 | -24 | -27 | -17 | -2 |
| 0 | -2 | -9 | -13 | -9 | -2 | 0 |

| −10 | −23 | −22 | −23 | −10 |
|---|---|---|---|---|
| −23 | 10 | 54 | 10 | −23 |
| −22 | 54 | 184 | 54 | −22 |
| −23 | 10 | 54 | 10 | −23 |
| −10 | −23 | −22 | −23 | −10 |

∗1/128

CHARACTER SPATIAL
FILTER COEFFICIENT

1602

| −4 | −10 | −9 | −10 | −4 |
|---|---|---|---|---|
| −10 | 8 | 34 | 8 | −10 |
| −9 | 34 | 92 | 34 | −9 |
| −10 | 8 | 34 | 8 | −10 |
| −4 | −10 | −9 | −10 | −4 |

∗1/128

IMAGE SPATIAL
FILTER COEFFICIENT

IMAGE PROCESSING USING DIFFERENT IMAGE SIZES DEPENDING ON WHETHER THE PROCESSING IS COLOR OR MONOCHROME

BACKGROUND OF THE INVENTION

The present invention relates to an image processing apparatus, method, and computer readable memory for processing input image data.

As an example of a conventional color image processing apparatus, color processing in a color copying machine is described below with the aid of FIG. 17.

Reference numeral 101 denotes a color image input unit such as an image reader unit of the color copying machine. In addition, the color image input unit 101 includes an original image reading device such as a color image scanner, an image input unit from a computer in a broad sense, and the like.

The color image input unit 101 outputs three color-separated signals R1, G1, and B1 which are obtained by color-separating each pixel of a color image into R, G, and B components. The three color-separated signals R1, G1, and B1 are input to an achromatic color/chromatic color determination unit 102. The unit 102 determines if the pixel of interest is a monochrome (achromatic color) pixel or a color (chromatic color) pixel, and outputs a determination signal KC to a color correction unit 107 on the basis of the determination result. The signal G1 of the three color-separated signals is input to a character/image determination unit 104, which checks if the pixel of interest corresponds to a line image such as a character, thin line, or the like, or a continuous-gradation image such as a picture image, printed image, or the like. The unit 104 outputs a character/image determination signal TI on the basis of the determination result.

The character/image determination signal TI is input to a spatial filter coefficient storage unit 105. When the corresponding pixel corresponds to a character signal, character spatial filter coefficients 1601 (see FIG. 18) are selected and output; when the corresponding pixel corresponds to an image signal, image spatial filter coefficients 1602 (see FIG. 18) are selected and output.

Conventional spatial filter processing including edge emphasis and the like is explained below.

FIG. 18 shows examples of the character spatial filter coefficients 1601 and image spatial filter coefficients 1602 described in FIG. 17 and each defined by a 5×5 pixel matrix. The character spatial filter coefficients 1601 are determined to effect stronger edge emphasis for an image than the image spatial filter coefficients 1602. Character or image spatial filter coefficients Kij selected in accordance with the character/image determination signal TI are set in a spatial filter 103 including R, G, and B spatial filters 103R, 103G, and 103B for R, G, and B signals. The individual spatial filters edge-emphasize the three color-separated signals R1, G1, and B1 to output three edge-emphasized color-separated signals R2, G2, and B2.

FIG. 19 shows an example of the detailed arrangement of the R spatial filter 103R.

A dotted frame 1701 represents a data delay circuit arranged in the R spatial filter 103R and including line memories 801 to 804. The signal R1 is input to the R spatial filter 103, and the line memories 801 to 804 store image data for four lines. The stored image data for four lines and image data for the line of interest, i.e., image data for a total of five lines, are sequentially input to flip-flops in units of lines to output data (Xj1 to Xj5) for five successive pixels. The signal R1 for 5 lines×5 pixels, i.e., a total of 25 signals R1, are input to an edge emphasis calculation circuit (R edge emphasis section) indicated by the next dotted frame 1702, which respectively multiplies the 25 input signals by spatial filter coefficients ($\alpha_{ij}$: $1 \leq i \leq 5$, $1 \leq j \leq 5$) indicated by a dotted frame 1703 and corresponding to the pixel layout and sums up the products.

The spatial filter processing for an R signal has been described, and the same applies to G and B signals.

The three edge-emphasized color-separated signals R2, G2, and B2 are input to a luminance/density conversion unit 106, and are converted into density signals C1, M1, and Y1 by, e.g., log conversion. The density signals C1, M1, and Y1 are input to a color correction unit 107 to be subjected to color processing such as generation of a black signal K, undercolor removal, color correction, and the like. As a result of the color processing, density signals C2, M2, Y2, and K2 are generated. Also, the color correction unit 107 sets the density signals C2, M2, and Y2 at C2=M2=Y2=0 in accordance with the determination signal KC as the determination result of the achromatic color/chromatic color determination unit 102 when the corresponding pixel is an achromatic pixel, thereby converting the corresponding pixel into a pixel defined by black color alone.

Reference numeral 110 denotes a color image output unit which comprises an image recording apparatus such as an electrophotographic or ink-jet printer. When the color image output unit 110 is, e.g., a binary printer, the density signals C2, M2, Y2, and K2 are converted into binary signals C3, M3, Y3, and K3 by a binarization unit 108. On the other hand, when the resolution of the image input from the color image input unit 101 is different from that of the image to be output from the color image output unit 110, the binary pixel signals C3, M3, Y3, and K3 are subjected to resolution conversion processing by a smoothing/resolution conversion unit 109 to be converted into binary signals C4, M4, Y4, and K4. Especially, when the resolution of the color image output unit 110 is higher than that of the color image input unit 101, smoothing processing for smoothly interpolating edge portions of the image is performed. The binary signals C4, M4, Y4, and K4 are recorded by the color image output unit 110.

However, when the input image is a color image, the above-mentioned color image processing apparatus requires spatial filters in correspondence with the R signal (103R), G signal (103G), and B signal (103B). If the input image is a black-and-white or monocolor image, not all the R, G, and B spatial filters need be used to perform spatial filter processing of the input image. For this reason, some spatial filters are wasted.

In order to especially improve the image quality of a monochrome image using a color image apparatus, it is required to improve filter characteristics by increasing the filter size. However, this results in high cost.

SUMMARY OF THE INVENTION

The present invention has been made in consideration of the above-mentioned problems, and has as its object to efficiently use a plurality of independent processing means.

It is another object of the present invention to provide an image processing apparatus, method, and computer readable memory, which can efficiently use filters by applying a plurality of filters arranged for filtering a color image to a monochrome image. It is still another object of the present invention to efficiently use a delay means for chromaticity signals by using it for delaying a lightness signal.

It is still another object of the present invention to provide an image processing apparatus, method, and computer readable memory, which can broaden the filtering range of filters used for a monochrome image by applying a plurality of filters arranged for filtering a color image to a monochrome image without increasing the circuit scale, and can especially improve the image quality of a monochrome image.

In order to achieve the above objects, an image processing apparatus according to the present invention comprises the following arrangement.

That is, an image processing apparatus for processing input image data, comprises:

a plurality of processing means which can execute parallel processing in units of component data of image data which is made up of a plurality of component data;

selection means for selecting whether the input image data is to be processed as a monochrome image or a color image; and control means for controlling to execute processing by the plurality of processing means for the image data stepwise when the selection means selects that the input image data is to be processed as a monochrome image.

Preferably, the control means serially connects the plurality of processing means, and controls to execute the processing for the image data stepwise using the plurality of serially connected processing means. By connecting the plurality of processing means in series with each other, processing for monochrome image data can be executed stepwise without increasing the circuit scale.

Preferably, the selection means determines on the basis of color component data of the input image data if the input image data is a monochrome image or a color image, and makes a selection on the basis of the determination result.

Preferably, the plurality of processing means correct spatial frequency characteristics of the image data.

In order to achieve the other objects, an image processing apparatus according to the present invention comprises the following arrangement.

That is, an image processing apparatus comprises:

a plurality of processing means which can execute parallel processing in units of component data of image data which is made up of a plurality of component data that are input parallelly; and control means for serially connecting the plurality of processing means and controlling to execute processing of the individual processing means for input image data stepwise.

In order to achieve the other objects, an image processing apparatus according to the present invention comprises the following arrangement.

That is, an image processing apparatus for processing input image data, comprises:

holding means for holding component data of image data which is made up of a plurality of component data in a predetermined size;

processing means for executing processing of predetermined component data held by the holding means on the basis of the held size of the component data;

selection means for selecting whether the input image data is to be processed as a monochrome image or a color image;

changing means for changing the size of the predetermined component data held by the holding means on the basis of a selection result of the selection means; and switching means for switching processing of the processing means for the predetermined component data held by the holding means in the size changed by the changing means to processing corresponding to the changed size.

Preferably, the changing means changes the size of the predetermined component data held by the holding means when the input image data is a monochrome image.

Preferably, the processing means corrects spatial frequency characteristics of the input image data by shifting a frequency corresponding to a maximum gain of MTF characteristics of the input image data toward a lower-frequency side.

Preferably, the selection means calculates a chromaticness signal on the basis of a chromaticity signal of the input image data, determines if the input image data is a monochrome or color image, and makes a selection on the basis of the determination result.

In order to achieve the other objects, an image processing apparatus according to the present invention comprises the following arrangement.

That is, an image processing apparatus comprises:

generation means for generating a lightness signal and a chromaticity signal associated with an input image; and first and second delay means which can be used for respectively delaying the lightness signal and chromaticity signal, wherein when the input image is to be processed as a monochrome image, both the first and second delay means are used for delaying the lightness signal.

In order to achieve the above objects, an image processing method according to the present invention comprises the following arrangement.

That is, an image processing method for processing input image data, comprises:

a plurality of processing steps which can be executed parallelly in units of component data of image data which is made up of a plurality of component data;

a selection step of selecting whether the input image data is to be processed as a monochrome image or a color image; and a control step of controlling to execute processing in the plurality of processing steps for the image data stepwise when it is selected in the selection step that the input image data is to be processed as a monochrome image.

In order to achieve the other objects, an image processing method according to the present invention comprises the following arrangement.

That is, an image processing method for processing input image data, comprises:

a holding step of holding component data of image data which is made up of a plurality of component data in a predetermined size;

a processing step of executing processing of predetermined component data held in the holding step on the basis of the held size of the component data;

a selection step of selecting whether the input image data is to be processed as a monochrome image or a color image;

a changing step of changing the size of the predetermined component data held in the holding step on the basis of a selection result in the selection step; and a switching step of switching processing of the processing step for the predetermined component data held in the holding step in the size changed in the changing step to processing corresponding to the changed size.

In order to achieve the other objects, an image processing method according to the present invention comprises the following arrangement.

That is, an image processing method comprises:

a generation step of generating a lightness signal and a chromaticity signal associated with an input image; and a first and second delay steps which can be used for respectively delaying the lightness signal and chromaticity signal, wherein when the input image is to be processed as a monochrome image, both the first and second delay steps are used for delaying the lightness signal.

In order to achieve the above objects, a computer readable memory according to the present invention comprises the following arrangement.

That is, a computer readable memory that stores program codes of image processing, comprises:

a program code of the plurality of processing steps which can be executed parallelly in units of component data of image data which is made up of a plurality of component data;

a program code of the selection step of selecting whether input image data is to be processed as a monochrome image or a color image; and a program code of the control step of controlling to execute processing in the plurality of processing steps for the image data stepwise when it is selected in the selection step that the input image data is to be processed as a monochrome image.

In order to achieve the other objects, a computer readable memory according to the present invention comprises the following arrangement.

That is, a computer readable memory that stores program codes of image processing, comprises:

a program code of the holding step of holding component data of image data which is made up of a plurality of component data in a predetermined size;

a program code of the processing step of executing processing of predetermined component data held in the holding step on the basis of the held size of the component data;

a program code of the selection step of selecting whether input image data is to be processed as a monochrome image or a color image;

a program code of the changing step of changing the size of the predetermined component data held in the holding step on the basis of a selection result in the selection step; and a program code of the switching step of switching processing of the processing step for the predetermined component data held in the holding step in the size changed in the changing step to processing corresponding to the changed size.

With the above-mentioned arrangement, a plurality of independent processing means can be efficiently used.

Also, an image processing apparatus, method, and computer readable memory, which can efficiently use filters, since a plurality of filters arranged for filtering a color image are also applied to a monochrome image, can be provided.

Since a delay means for chromaticity signals is used for delaying a lightness signal, the delay means can be efficiently used.

Furthermore, an image processing apparatus, method, and computer readable memory, which can broaden the filtering range of filters used for a monochrome image by applying a plurality of filters arranged for filtering a color image to a monochrome image without increasing the circuit scale, and can especially improve image quality of a monochrome image, can be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3A is a block diagram showing the principle of switching of spatial filters during color processing according to the first embodiment;

FIG. 3B is a block diagram showing the principle of switching of spatial filters during monochrome processing according to the first embodiment;

FIG. 10 shows spatial filter coefficients according to the second embodiment;

FIG. 11 shows spatial filter coefficients in 7×7 pixels according to the second embodiment;

FIG. 18 shows spatial filter coefficients of the conventional color image processing apparatus;

DESCRIPTION OF THE PREFERRED EMBODIMENTS

The preferred embodiments of the present invention are described in detail hereinafter with reference to the accompanying drawings.

<First Embodiment>

An embodiment according to the present invention is described below with reference to the accompanying drawings.

Figure 1:
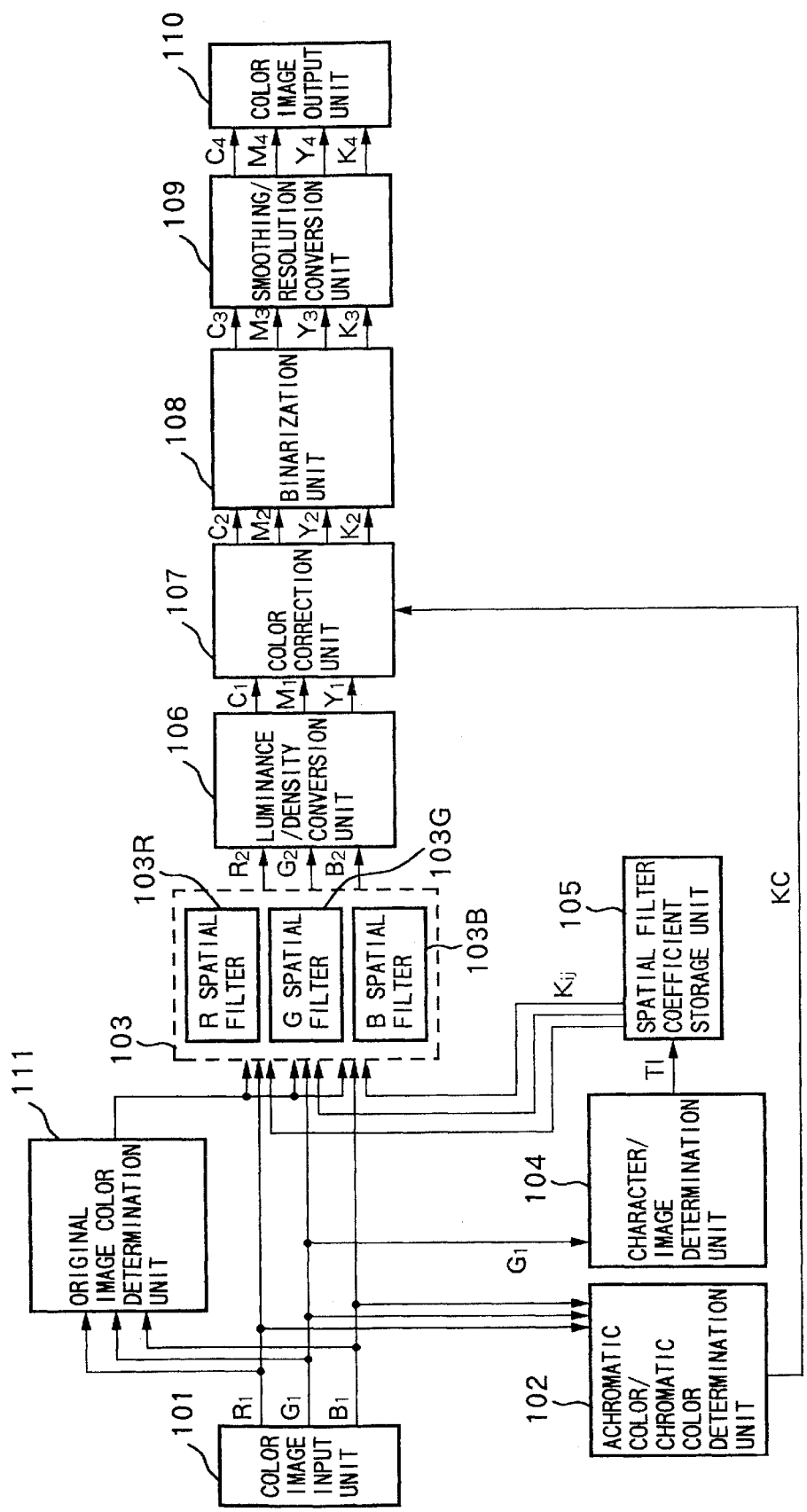
FIG. 1 is a block diagram showing the arrangement of a color image processing apparatus according to the first embodiment of the present invention.

FIG. 1 is a block diagram showing the arrangement of a color image processing apparatus according to the first embodiment of the present invention.

In FIG. 1, reference numerals 101 to 110 denote units that have already been described in the paragraphs of the prior art: a color image input unit 101, an achromatic color/chromatic color determination unit 102, a spatial filter 103, a character/image determination unit 104, a spatial filter coefficient storage unit 105, a luminance/density conversion unit 106, a color correction unit 107, a binarization unit 108, a smoothing/resolution conversion unit 109, and a color image output unit 110.

The characteristic feature of the first embodiment of the present invention is that an original image color determination unit 111 which reads (pre-scans) the original to be copied in advance and checks based on the reading result if the original to be copied is a color original or monochrome original is added to the arrangement of the conventional color image processing apparatus. Also, the first embodiment is characterized in that the method of using R, G, and B spatial filters 103R, 103G, and 103B that make up the spatial filter 103 is switched in correspondence with the determination result of the unit 111.

The processing of the original image color determination unit 111 executed by the pre-scan as the characteristic feature of the first embodiment are described in detail below.

Figure 2A:
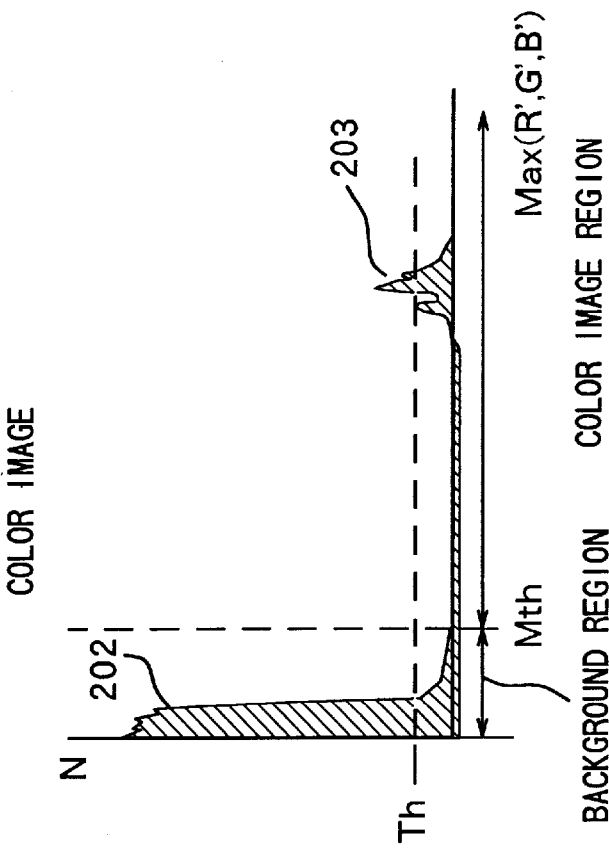
FIG. 2A is a graph for explaining original image color determination according to the first embodiment.
Figure 2B:
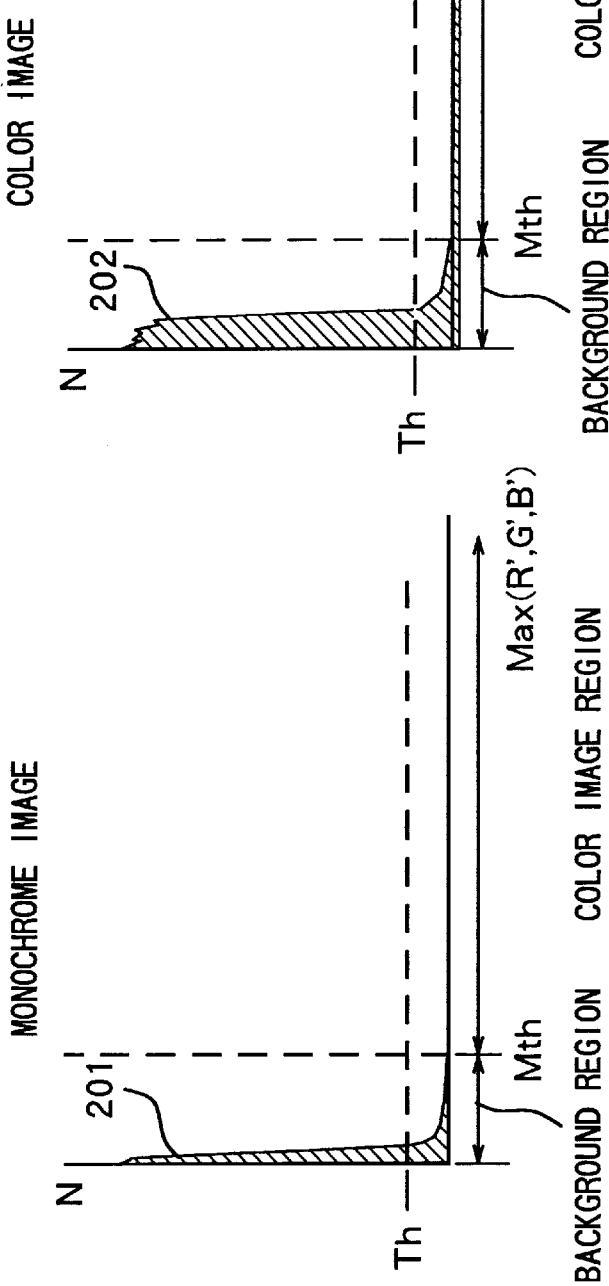
FIG. 2B is a graph for explaining original image color determination according to the first embodiment.

When the pre-scan starts, three color-separated signals R1, G1, and B1 of each pixel of an original image are read by the color image input unit 101, and are input to the original image color determination unit 111. The original image color determination unit 111 performs statistical processing for the three color-separated signals R1, G1, and B1, and checks based on the processing result in advance if the original to be copied is a color original or monochrome original. As an example of the statistical processing, a histogram for the entire surface of the original image may be calculated, and determination may be performed using a threshold value. FIGS. 2A and 2B show examples of the histograms of a monochrome image and a color image, respectively. In these histograms, R', G', and B' are obtained by calculating:

$$R'=R1-\text{Min}(R1,G1,B1)$$

$$G'=G1-\text{Min}(R1,G1,B1)$$

$$R'=B1-\text{Min}(R1,G1,B1) \quad (1)$$

Accumulated pixels 201 shown in FIG. 2A represent an undercolor (white) portion and an image portion. In both these portions, pixels are distributed at saturation or chromaticness=0, and there are no accumulated pixels in a region with higher chromaticness S (color image region). On the other hand, accumulated pixels 202 shown in FIG. 2B represent an undercolor (white) portion and an achromatic color image portion of the color image original, and accumulated pixels 203 of a color image portion are also distributed. As an example of the method of discriminating the difference between such images, a method of checking if accumulated pixels N equal to or larger than a predetermined threshold value (N≧Th) are present in the color image region (Max(R', G', B')≧Mth) in the histogram may be used.

When accumulated pixels N equal to or larger than the predetermined threshold value (N≧Th) are present in the color image region (Max(R', G', B')≧Mth) (e.g., the accumulated pixels 203 in FIG. 2B), it is determined that the original image of interest is a color image; otherwise, a monochrome image. The determination result is input to the spatial filter 103 to switch the method of using the R, G, and B spatial filters 103R, 103G, and 103B that make up the spatial filter 103.

Switching of the method of using the R, G, and B spatial filters 103R, 103G, and 103B that form the spatial filter 103 is described in detail below with the aid of FIGS. 3A and 3B.

Figure 19:
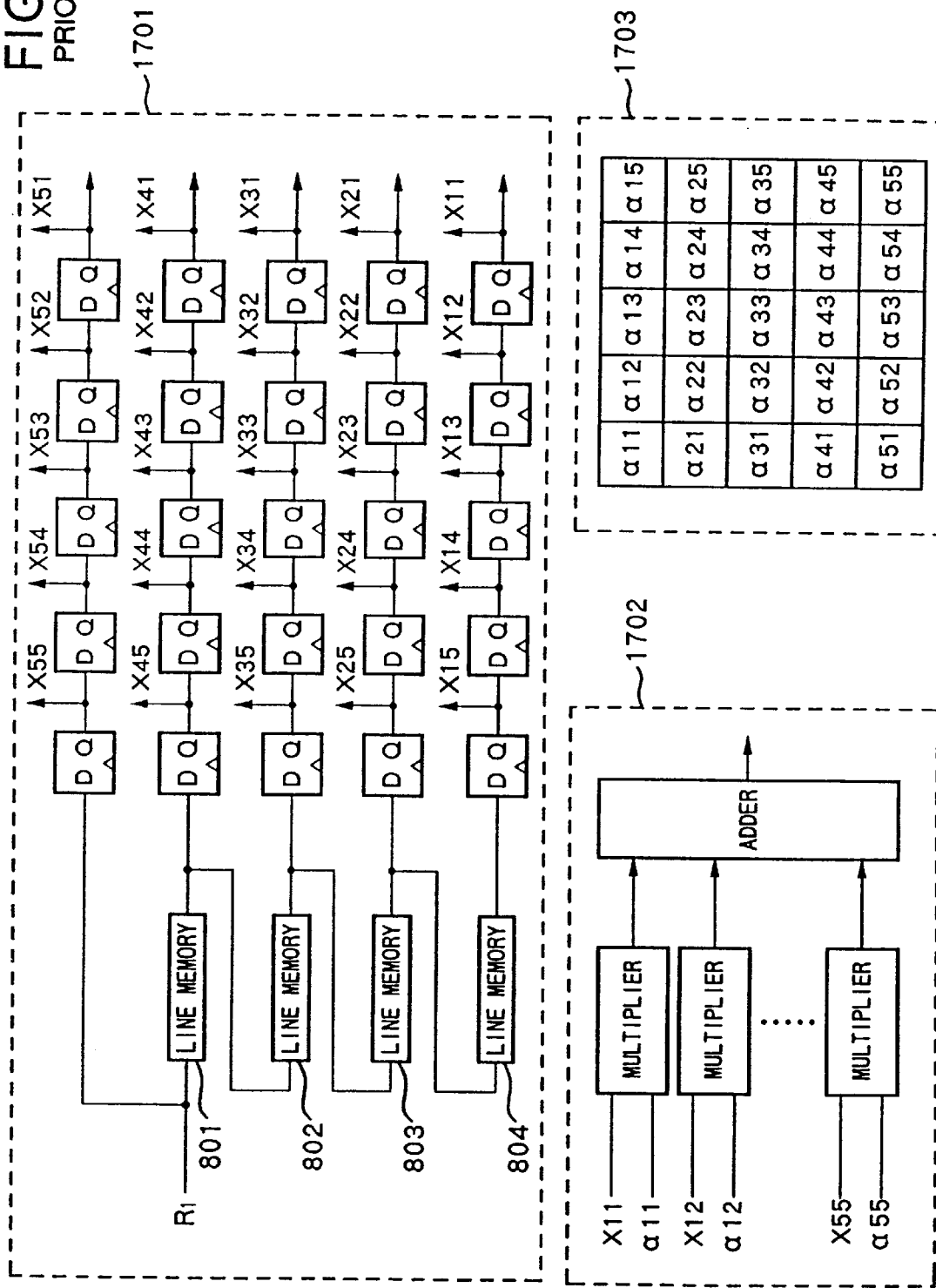
FIG. 19 is a block diagram showing the arrangement of a spatial filter in the conventional color image processing apparatus.

When a color original is determined based on the signal output from the original image color determination unit 111, spatial filter processing for line-delaying input data and edge-emphasizing the delayed data, as shown in FIG. 3A, is done. More specifically, in this embodiment, the three color-separated signals R1, G1, and B1 are respectively input to the R, G, and B spatial filters 103R, 103G, and 103B. Image data for four lines delayed by line memories 801 to 804 in each spatial filter and image data for the current line, i.e., image data for a total of five lines are input to the corresponding edge emphasis section. The edge emphasis section executes edge emphasis using character or image spatial filter coefficients Kij selected by the above-mentioned character/image determination signal TI. As a consequence, the individual filters output three edge-emphasized color-separated signals R2, G2, and B2. Note that each of the R, G, and B edge emphasis sections has the same function as that of the block 1702 in FIG. 19 described in the prior art.

On the other hand, when a monochrome original is determined based on the signal output from the original image color determination unit 111, since the three color-separated signals R1, G1, and B1 are equivalent to each other, only one of the spatial filters need to be used. When the monochrome original is determined, the R, G, and B spatial filters are connected in series with each other, as shown in FIG. 3B to build a spatial filter that can add steeper characteristics to image data without increasing the circuit scale, i.e., without any increases in cost.

Hence, when a monochrome original is determined, a lightness signal L1 equivalent to all the three color-separated signals R1, G1, and B1 is input to one of the R, G, and B spatial filters 103R, 103G, and 103B. Then, image data for four lines delayed by line memories 801 to 804 in each spatial filter and image data for the current line, i.e., image data for a total of five lines are input to the corresponding edge emphasis section. The edge emphasis section executes edge emphasis using character or image spatial filter coefficients Kij selected by the above-mentioned character/image determination signal TI. Such processing is performed three times in the individual series-connected spatial filters while changing the spatial filter coefficients. As a result, a lightness signal L2 that has been subjected to spatial filter processing three times while changing the spatial filter coefficients is output. In this manner, spatial filter processing by combining the characteristics of the individual spatial filters is realized.

For example, in the series-connected spatial filters shown in FIG. 3B, smoothing characteristics may be selected as the filter characteristics of the first, R spatial filter 103R, and edge emphasis characteristics may be selected as the filter characteristics of the second and third, G and B spatial filters 103G and 103B. In this manner, the degree of freedom in setting the filter characteristics of the spatial filters is increased.

Figure 4:
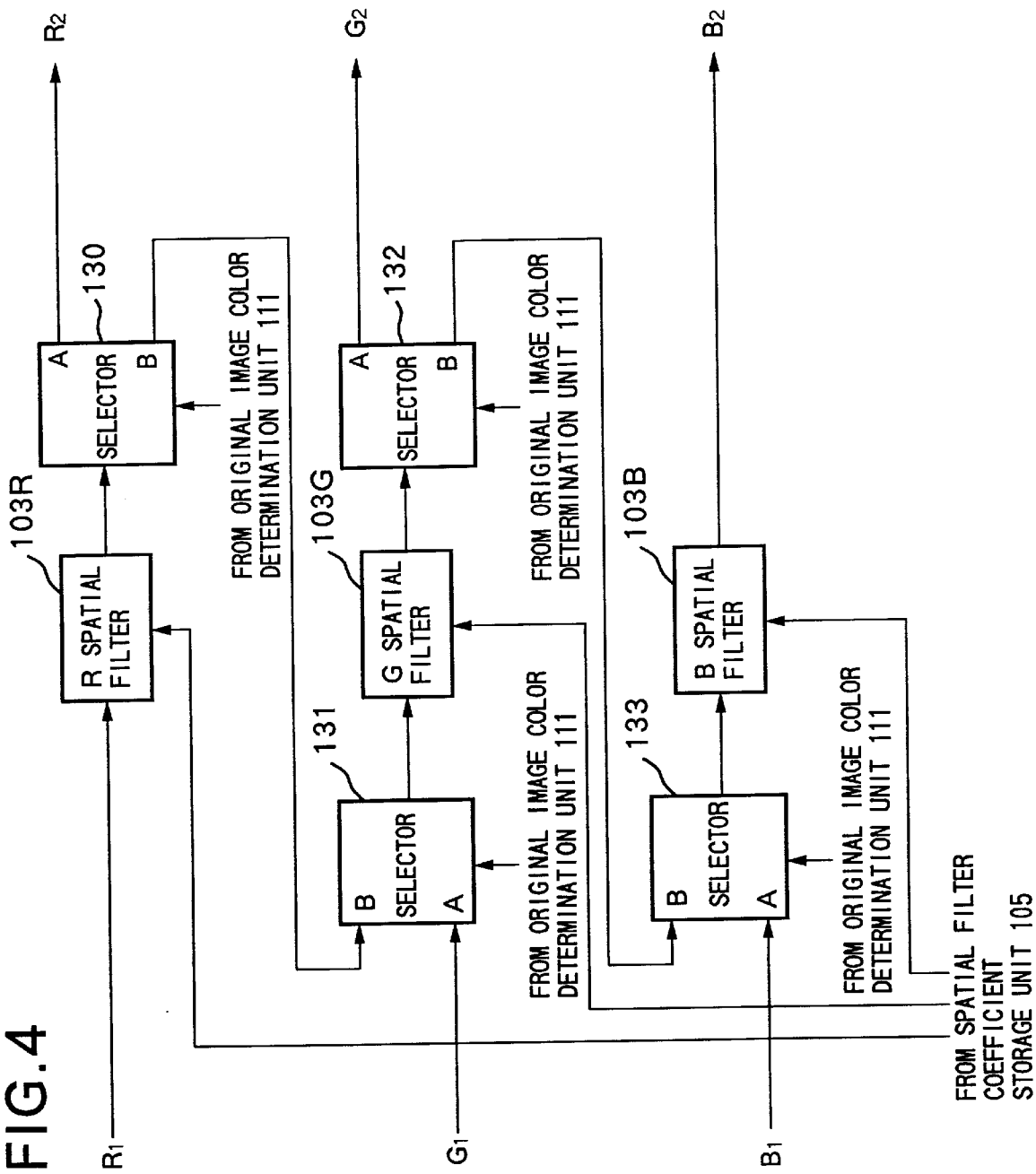
FIG. 4 is a block diagram showing the arrangement for switching the spatial filters according to the first embodiment in detail.

The above-mentioned methods of using the spatial filters for color and monochrome originals is selected by an arrangement shown in, e.g., FIG. 4.

In FIG. 4, reference numerals 130 to 133 denote selectors, each of which selects the A side when a color original is determined by the original image color determination unit 111, and selects the B side when a monochrome original is determined. In correspondence with this selection, coefficients set by the spatial filter coefficient storage unit 105 are also switched between color and monochrome images.

In the case of a monochrome image, since the signals R1, G1, and B1 are assumed to have nearly equal values, a value R1 can be used as a value L1 in FIG. 3B, and a value B2 can be used as a value L2. Alternatively, a circuit for generating a luminance signal from the signals R1, G1, and B1 may be added, and the generated luminance signal may be used as L1.

As described above, in correspondence with the type of original image read by the pre-scan, the original image color determination unit 111 selects one of the methods of using the R, G, and B spatial filters 103R, 103G, and 103B that make up the spatial filter 103, as shown in FIGS. 3A and 3B. Thereafter, a main scan for outputting an actual original image is performed.

The main scan is described below.

In the main scan, when it is determined by the original image color determination unit 111 that the original read by the pre-scan is a monochrome original, the spatial filter processing is performed by the method of using the spatial filter 103 described above with reference to FIG. 3B. On the other hand, when it is determined by the original image color determination unit 111 that the original read by the pre-scan is a color original, the spatial filter processing is performed by the method of using the spatial filter 103 described above with reference to FIG. 3A.

Three color-separated signals R2, G2, and B2 output from the spatial filter 103 are input to the luminance/density conversion unit 106 and are converted into density signals C1, M1, and Y1 as in the above-mentioned prior art. The density signals C1, M1, and Y1 are subjected to color processing such as generation of a black signal K, undercolor removal, color correction, and the like by the color correction unit 107 in accordance with a determination signal KC as the determination result of the achromatic color/chromatic color determination unit 102. As a result of the color processing, density signals C2, M2, Y2, and K2 are output. For example, color correction that places an importance on the color reproducibility of a highlight portion may be used for an image signal of image data, and color correction without highlight reproduction with the under-color being removed may be used for color and black character signals.

Finally, the binarization unit 108 and the smoothing/resolution conversion unit 109 execute their processing operations as in the above-mentioned prior art, and the color image output unit 110 records a color image of the read original.

As described above, according to the first embodiment, whether the original to be processed in the color image processing apparatus is a color or monochrome original is determined. When it is determined as a result of determination that the original to be processed is a monochrome original, connections of the plurality of spatial filters equipped in the color image processing apparatus are switched so that these spatial filters are used in multiple steps, thereby performing spatial filter processing for that monochrome original. In this manner, steeper filter characteristics can be set for a monochrome original without adding any new filter region for performing spatial filter processing for a monochrome original.

<Second Embodiment>

Figure 5:
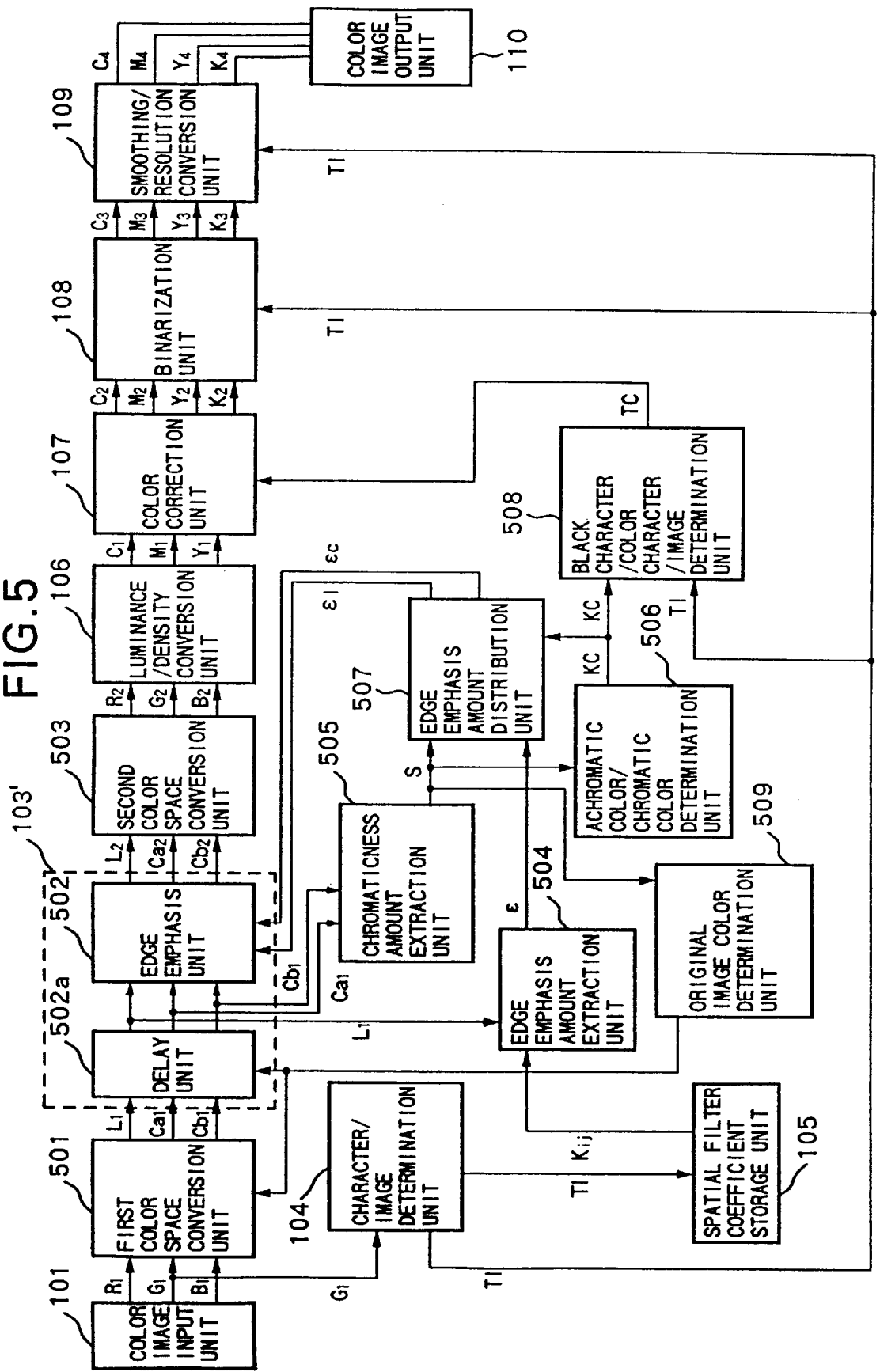
FIG. 5 is a block diagram showing the arrangement of a color image processing apparatus according to the second embodiment of the present invention.

The present invention is effective not only for the arrangement discussed in the first embodiment, but also can be applied to a color image processing apparatus with the arrangement shown in FIG. 5 and can obtain the same effect as in the first embodiment.

The arrangement of a color image processing apparatus used in the second embodiment will be explained below with reference to FIG. 5.

FIG. 5 is a block diagram showing the arrangement of the color image processing apparatus according to the second embodiment of the present invention.

In FIG. 5, reference numerals 101 and 104 to 110 denote units that have already been described in the paragraphs of the prior art: a color image input unit 101, a character/image determination unit 104, a spatial filter coefficient storage unit 105, a luminance/density conversion unit 106, a color correction unit 107, a binarization unit 108, a smoothing/resolution conversion unit 109, and a color image output unit 110. Note that a spatial filter 103' is functionally equivalent to the spatial filter 103 in the first embodiment. Other arrangements are described in the descriptions of processing executed in the second embodiment.

The characteristic feature of the second embodiment of the present invention is that an original image color determination unit 509 which reads (pre-scans) the original to be copied and checks based on the reading result if the original to be copied is a color or monochrome original is arranged, as in the first embodiment. Also, the second embodiment is characterized in that the method of using line memories that make up a delay unit 502a in the spatial filter 103' is switched in correspondence with the determination result of the unit 509.

The processing of the original image color determination unit 509 executed by the pre-scan as the characteristic feature of the first embodiment is described in detail below.

When the pre-scan starts, three color-separated signals R1, G1, and B1 of each pixel of an original image are read by the color image input unit 101, and are input to a first color space conversion unit 501. The three color-separated signals R1, G1, and B1 are converted into a lightness signal L1 representing lightness and chromaticity signals (Ca1, Cb1) representing color tones by the first color space conversion unit 501. The lightness signal L1 and the chromaticity signals (Ca1, Cb1) may be either three variables L*, a*, and b* in the CIE1976 (L*a*b*) color space or three variables L*, u*, and v* in the CIE1976 (L*u*v*) color space calorimetrically, or may be those in an arbitrary color space determined by a simpler method. Equations (2) below present an example of conversion formulas for converting three color-separated signals R1, G1, and B1 into lightness and chromaticity signals L1 and (Ca1, Cb1) by a simple method.

$$L1=(R1+2G1+B1)/4$$
$$Ca1=(R1-G1)/2$$
$$Cb1=(R1+G1-2B1)/4 \qquad (2)$$

Among the lightness signal L1 and chromaticity signals (Ca1, Cb1) output from the first color space conversion unit 501, the chromaticity signals (Ca1, Cb1) are input to a chromaticness amount extraction unit 505 via the delay unit 502a. The chromaticness amount extraction unit 505 calculates a chromaticness signal S that represents the vividness of a color on the basis of the chromaticity signals (Ca1, Cb1). For example, when the chromaticity signals (Ca1, Cb1) correspond to signals (u*, v*) in the above-mentioned CIE1976 (L*a*b*) color space, the chromaticness signal S is given by:

$$S=(Ca1^2+Cb1^2)^{0.5} \qquad (3)$$

Furthermore, the chromaticness signal S may more simply be determined by the following equation (4):

$$S=MAX(Ca1,Cb1) \qquad (4)$$

where the function MAX(A, B) outputs a larger one of absolute value of variables A and B.

Figure 6:
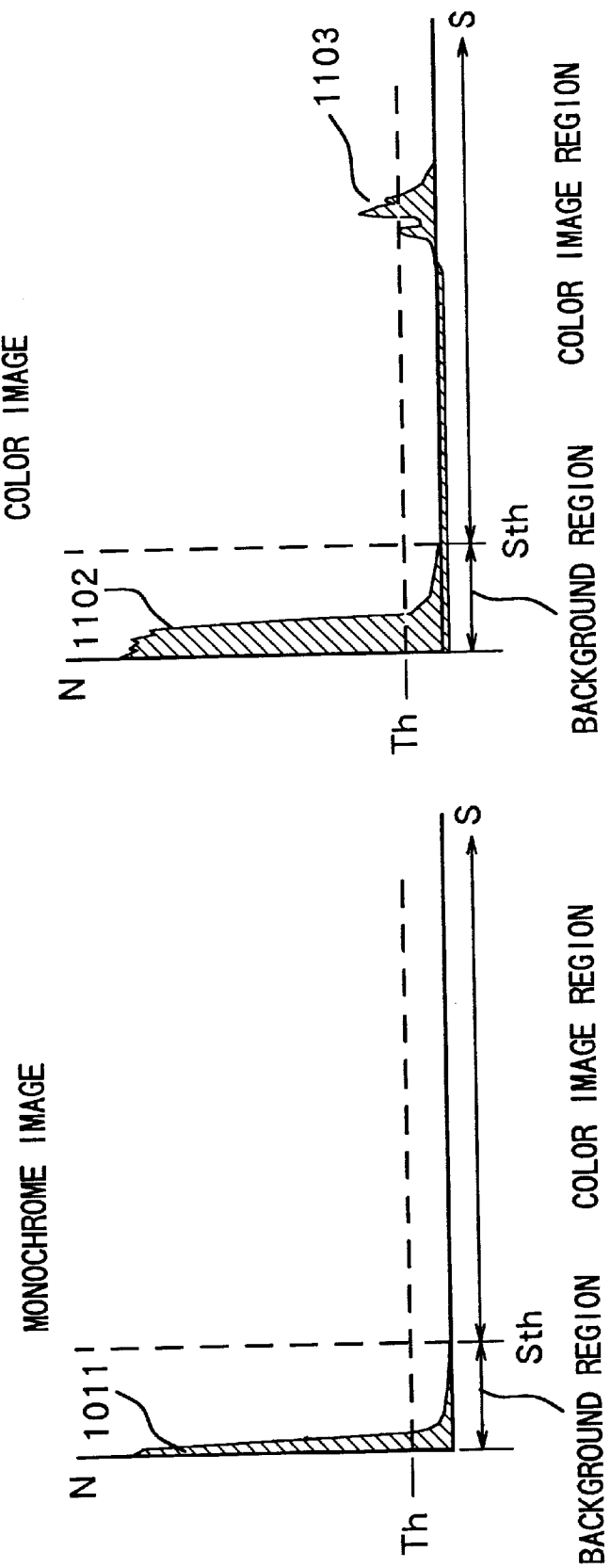
FIG. 6A is a graph for explaining original image color determination according to the second embodiment.
FIG. 6B is a graph for explaining original image color determination according to the second embodiment.

The chromaticness signals S in units of pixels obtained by the above-mentioned calculation are input to the original image color determination unit 509. The original image color determination unit 509 performs statistical processing for the chromaticness signals S, and checks based on the processing result in advance if the original to be copied is a color original or monochrome original. As an example of the statistical processing, a histogram of chromaticness signals S on the entire surface of the original image may be calculated, and determination may be performed using a threshold value. FIGS. 6A and 6B show examples of the histograms of a monochrome image and a color image, respectively.

Accumulated pixels 1011 shown in FIG. 6A represent an undercolor (white) portion and an image portion. In both these portions, pixels are distributed at saturation or chromaticness=0, and there are no accumulated pixels in a region with higher chromaticness S (color image region). On the other hand, accumulated pixels 1102 shown in FIG. 6B represent an undercolor (white) portion and an achromatic color image portion of the color image original, and accumulated pixels 1103 of a color image portion are also distributed. As an example of the method of discriminating the difference between such images, a method of checking if accumulated pixels N equal to or larger than a predetermined threshold value (N≧Th) are present in the color image region (S≧Sth) in the histogram may be used.

When accumulated pixels N equal to or larger than the predetermined threshold value (N≧Th) are present in the color image region (S≧Sth) (e.g., the accumulated pixels 1103 in FIG. 6B), it is determined that the original image of interest is a color image; otherwise, a monochrome image. The determination result is input to the first color space conversion unit 501 and the delay unit 502a. In particular, when the determination result indicates a monochrome image, the first color space conversion unit 501 forcibly outputs signals Ca1=Cb1=0, thereby converting the three color-separated signals R1, G1, and B1 into complete achromatic color signals. As a consequence, edge emphasis (to be described later) executed by an edge emphasis unit 502 in the spatial filter 103' is performed for the lightness signal L1 alone, and the color difference signals are Ca=Cb=0 even after the edge emphasis.

Figure 7:
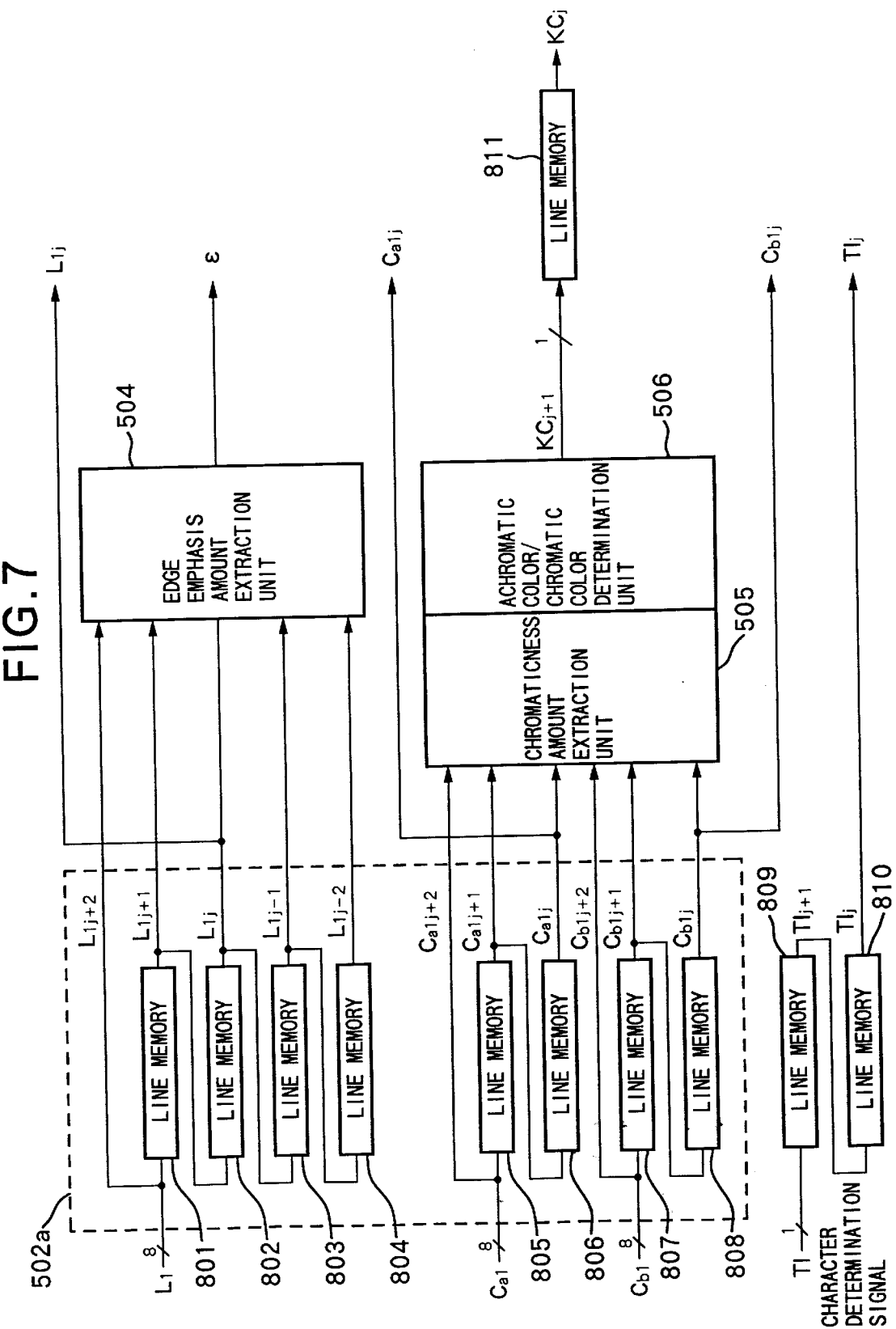
FIG. 7 is a block diagram showing the arrangement for switching line memories during color processing according to the second embodiment.

When it is determined that the original image is a color image, the delay unit 502a stores the lightness signal L1 and chromaticity signals (Ca1, Cb1) output from the first color space conversion unit 501. That is, as shown in FIG. 7, line memories 801 to 804 that make up the delay unit 502a store lightness signals L1 for four lines. Also, line memories 805 and 806, and 807 and 808 respectively store chromaticity signals Ca1 and Cb1 each for two lines to be synchronized with the central pixel of the lightness signals L1. On the other hand, when it is determined that the original image is a monochrome image, since the chromaticity signals Ca1 and Cb1 are zero, the line memories 805 to 808 among the line memories 801 to 808 that make up the delay unit 502a shown in FIG. 7 need not be used. When a character determination signal TI is not used, line memories 809 and 810 need not be used, either.

Figure 8:
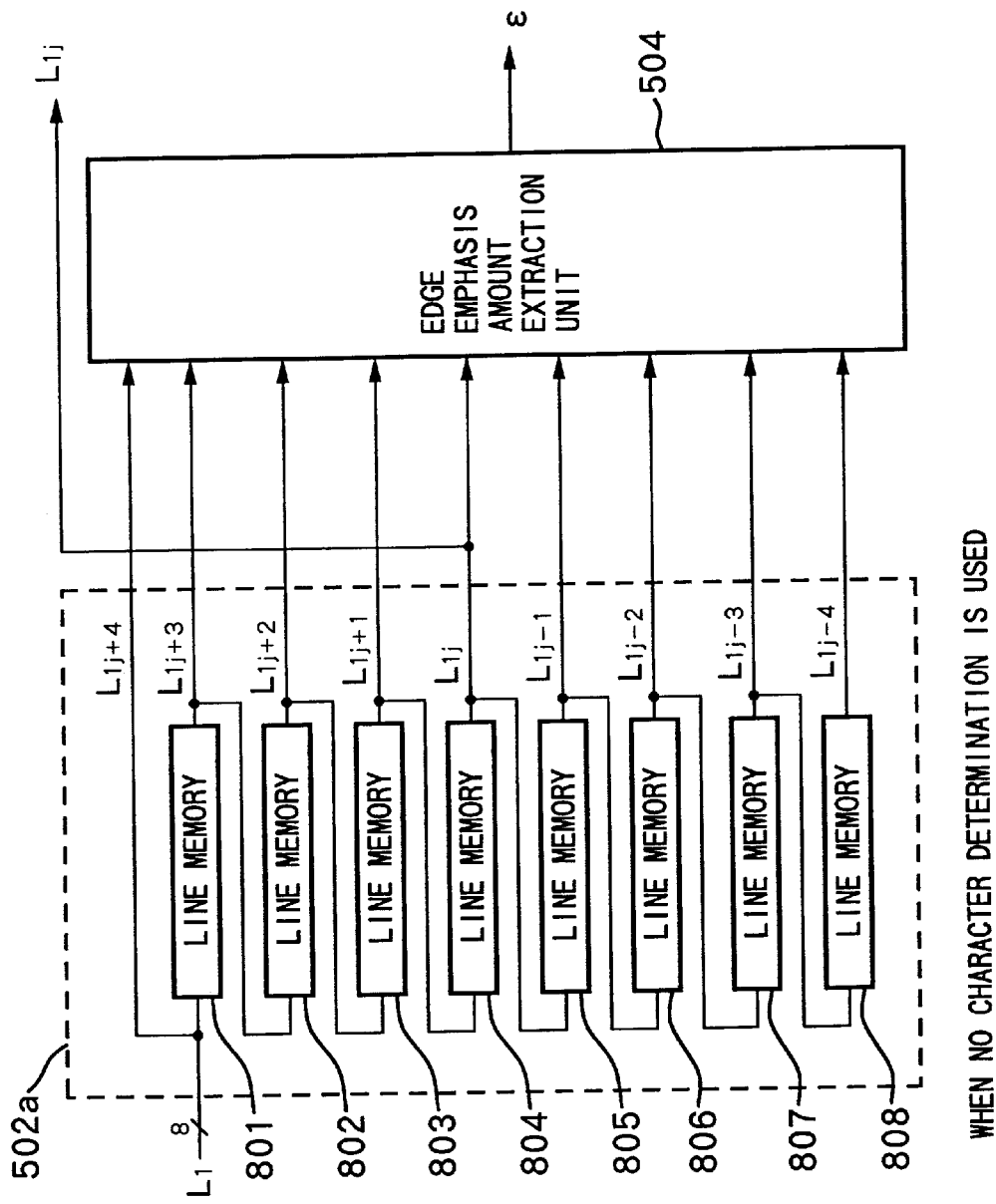
FIG. 8 is a block diagram showing the arrangement for switching line memories during monochrome processing according to the second embodiment.
Figure 9:
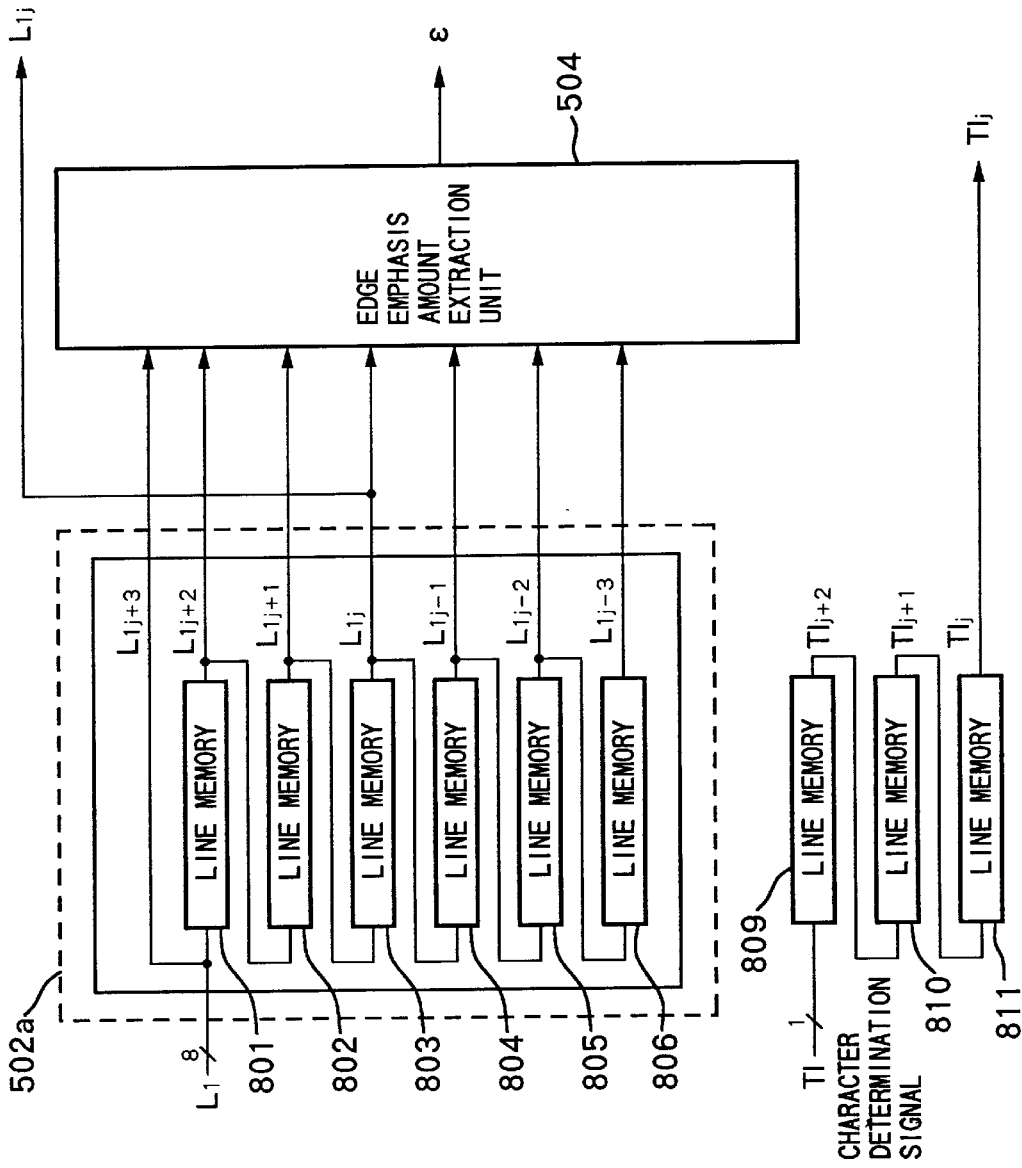
FIG. 9 is a block diagram showing the arrangement for switching line memories during processing upon determination of a monochrome character according to the second embodiment.

As shown in FIG. 8, when no character determination is performed during image processing of a monochrome image, the line memories 805 to 808 which need not be used and originally store chromaticity signals Ca1 and Cb1 are connected in series with the line memories 801 to 804 that store lightness signals L1, thus building a large, 9×9 pixel spatial filter 103'. On the other hand, when character determination is performed during image processing of a monochrome image, the line memories 805 and 806 which need not be used and originally store chromaticity signals Ca1 are connected in series with the line memories 801 to 804 that store lightness signals L1, as shown in FIG. 9, so as to realize a large, 7×7 pixel spatial filter 103', thus allowing processing in synchronism with the timing of the character determination signal. In this manner, when it is determined by the pre-scan that the original to be copied is a monochrome original or a monochrome character original, the connections of the line memories 801 to 808 that make up the delay unit 502a are changed to form a spatial filter 103' having steeper filter characteristics.

As described above, in correspondence with the type of original image read by the pre-scan, the original image color determination unit 509 selects one of the methods of using the line memories shown in FIGS. 7 to 9. Thereafter, a main scan for outputting an actual original image is performed.

The main scan is described below.

A signal G1 of three color-separated signals R1, G1, and B1 of a color image read by the color image input unit 101 is input to the above-mentioned character/image determination unit 104. The character/image determination unit 104 checks if the input signal G1 corresponds to a line image such as a character, thin line, or the like, or a continuous-gradation image such as a picture image, printed image, or the like, and outputs a character/image determination signal TI.

The character/image determination signal TI is input to the spatial filter coefficient storage unit 105. When the corresponding pixel corresponds to a character signal, character spatial filter coefficients 601 (see FIG. 10) are selected and output; when the corresponding pixel corresponds to an image signal, image spatial filter coefficients 602 (see FIG. 10) are selected and output. FIG. 10 shows examples of the character spatial filter coefficients 601 and image spatial filter coefficients 602 of the second embodiment, each defined by a 5×5 matrix.

On the other hand, the three color-separated signals of the color image are input to the first color space conversion unit 501, and are converted into a lightness signal L1 and chromaticity signals (Ca1, Cb1). The lightness signal L1 and chromaticity signals (Ca1, Cb1) converted by the first color space conversion unit 501 are input to the delay unit 502*a*. In the delay unit 502*a*, the line memories that make up the delay unit 502*a* store lightness signals L1 for N lines, and stores chromaticity signals (Ca1, Cb1) for N/2 lines. At this time, when it is determined based on the signal from the original image color determination unit 509 obtained by the pre-scan that the original of interest is a color original, the spatial filter processing is performed by the method of using the line memories described above with reference to FIG. 7. On the other hand, when it is determined that the original of interest is a monochrome original, the spatial filter processing is performed by the method of using the line memories described above with reference to FIG. 8. When it is determined that the original of interest is a monochrome original but is not a character original, the spatial filter processing is performed by the method of using the line memories described above with reference to FIG. 9. The difference between the methods shown in FIGS. 8 and 9 is that the character determination signal may or may not be used, as described above.

Figure 12:
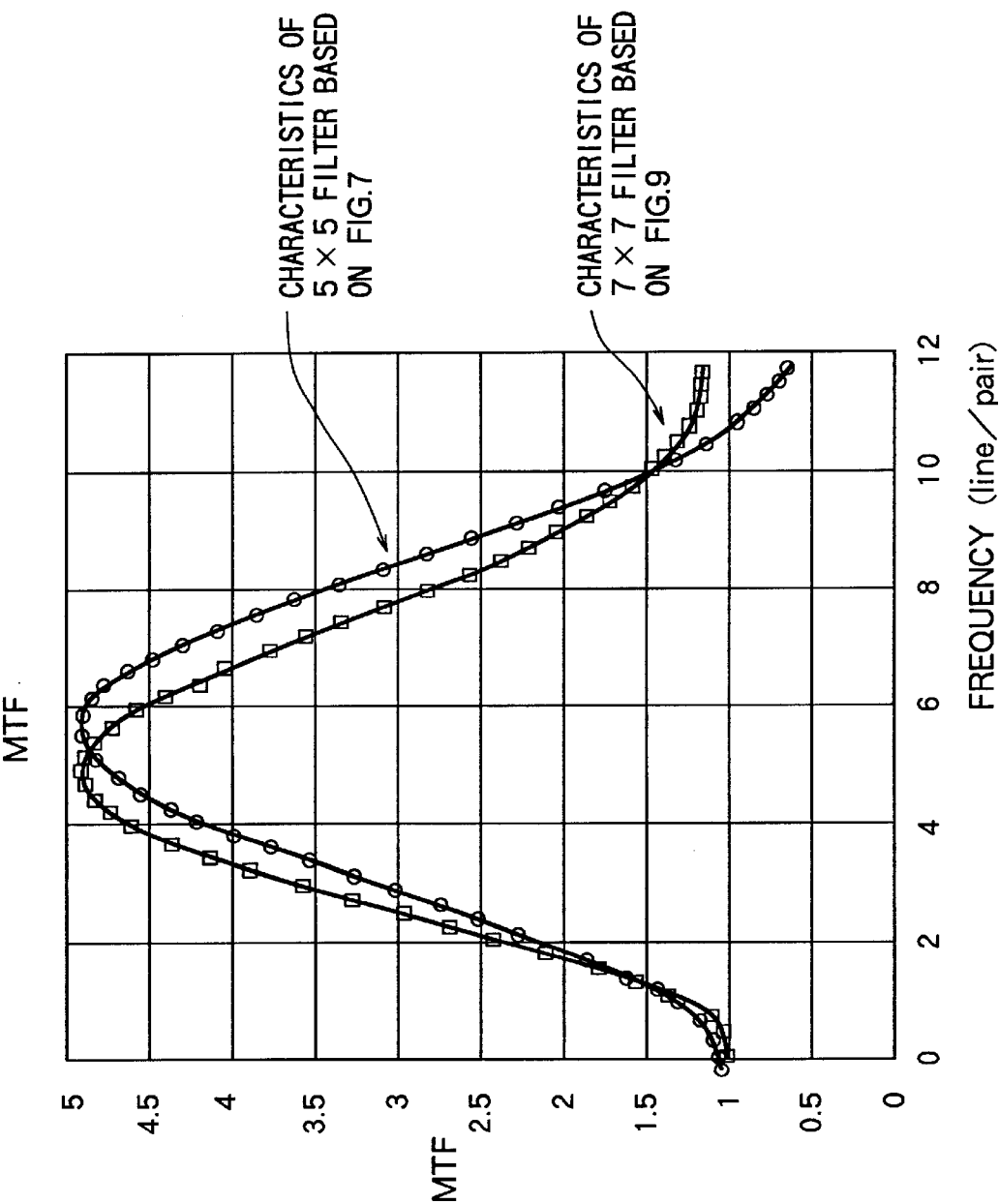
FIG. 12 is a graph showing the Modulation Transfer Function (MTF) characteristics of spatial filters corresponding to 5×5 pixels and 7×7 pixels according to the second embodiment.

FIG. 11 shows an example of spatial filter coefficients in the 7×7 pixel matrix when the line memories are used by the method shown in FIG. 9, and FIG. 12 shows an example of MTF characteristics obtained when edge emphasis is performed using the spatial filter coefficients in FIGS. 10 and 11.

FIG. 12 shows the Modulation Transfer Function (MTF) characteristics obtained when an input image is sampled at 600 DPI (24 line/pair). As shown in FIG. 12, the MTF characteristics obtained using the spatial filter coefficients in the 7×7 pixel matrix can shift the frequency corresponding to a maximum gain toward the lower-frequency side as compared to those obtained using the spatial filter coefficients in the 5×5 pixel matrix. That is, a large gain is assured within the frequency range from 2 to 4 line/pair corresponding to the visual sense characteristics of a human being. Hence, as can be seen from the above description, the spatial filter coefficients in the 9×9 pixel matrix described above with reference to FIG. 8 can provide further improved MTF characteristics.

The lightness signal L1 line-delayed by the delay unit 502*a* is input to an edge emphasis amount extraction unit 504. An edge emphasis amount $\epsilon$ is extracted using the character or image spatial filter coefficients Kij selected in accordance with the above-mentioned character/image determination signal TI. The edge emphasis amount $\epsilon$ is input to an edge emphasis amount distribution unit 507, and is distributed to an edge emphasis correction amount $\epsilon l$ for the lightness signal L1 and an edge emphasis correction amount $\epsilon c$ for the chromaticity signals (Ca1, Cb1) on the basis of the magnitude of the chromaticness signal S simultaneously input to the edge emphasis amount distribution unit 507 and a determination signal KC from an achromatic color/chromatic color determination unit 506.

The achromatic color/chromatic color determination unit 506 checks if the pixel of interest is a monochrome (achromatic color) pixel or a color (chromatic color) pixel, and outputs a determination signal KC. The difference between the unit 506 of this embodiment and the conventional achromatic color/chromatic color determination unit 102 is that the R, G, and B signals are input to the conventional achromatic color/chromatic color determination unit 102, while the chromaticness signal S is input to the achromatic color/chromatic color determination unit 506 of this embodiment. When the chromaticness signal S is small, the achromatic color/chromatic color determination unit 506 determines that the pixel of interest is a monochrome (achromatic color) pixel; otherwise, a color (chromatic color) pixel. Also, more simply, the determination signal KC is given by relations (5) below using a predetermined threshold value $\rho$:

(When $S<\rho$)KC=achromatic color (When $\rho \leq S$)KC=chromatic color     (5)

On the other hand, the chromaticity signals (Ca1, Cb1) delayed by the delay unit 502*a* are also input to the chromaticness amount extraction unit 505 to generate a chromaticness signal S. The method of generating the chromaticness signal S is as described above.

A process for generating edge emphasis correction amounts $\epsilon l$ and $\epsilon c$ on the basis of the edge emphasis amount $\epsilon$, the chromaticness signal S, and the achromatic color/chromatic color determination signal KC input to the edge emphasis amount distribution unit 507 when it is determined by the pre-scan that the original to be read is a color original is explained below.

The edge emphasis correction amount $\epsilon l$ for the lightness signal L1 is explained below. Basically, as the chromaticness is lower (closer to an achromatic color), a larger edge emphasis amount $\epsilon$ is distributed to the lightness signal L1, and for an achromatic color signal pixel, a full edge emphasis amount $\epsilon$ is assigned to the edge emphasis correction amount $\epsilon l$. On the other hand, for a pixel having a chromaticness level equal to or higher than a predetermined threshold value, no edge correction for the lightness signal L1 is performed.

Figure 13:
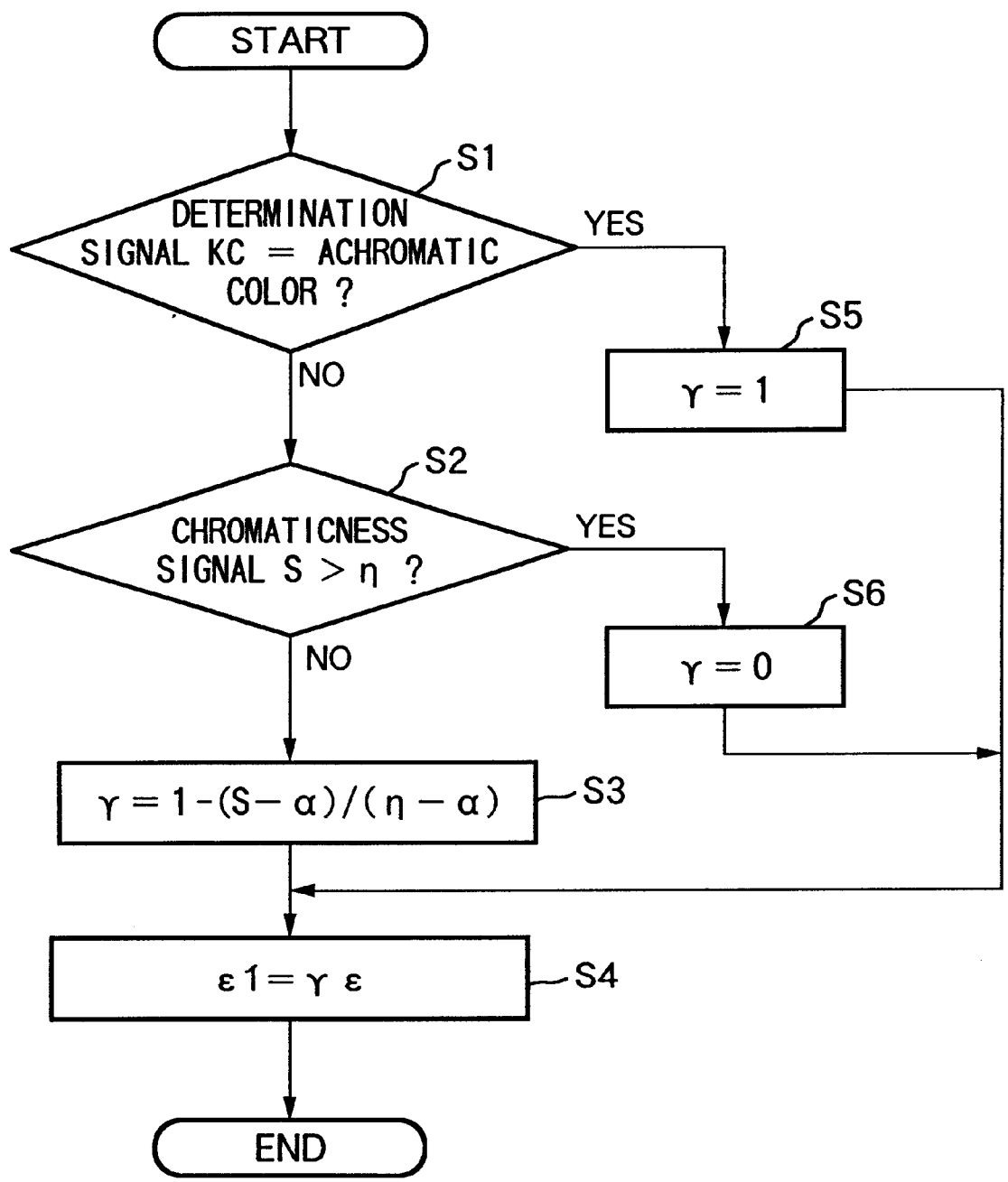
FIG. 13 is a flow chart showing the edge emphasis correction amount generation for a lightness signal by an edge emphasis amount distribution unit according to the second embodiment.

This mechanism is explained below with the aid of the flow chart in FIG. 13 and the graph in FIG. 14.

In step S1, it is checked in accordance with the achromatic color/chromatic color determination signal KC if the pixel of interest is an achromatic color pixel. If the determination signal KC indicates an achromatic color (YES in step S1), the flow advances to step S5, a ratio $\gamma$ for assigning a full edge emphasis amount $\epsilon$ to an edge emphasis correction amount $\epsilon l$ is set at "1". In step S4, the edge emphasis correction amount $\epsilon l = \gamma \epsilon$ is calculated using the set ratio $\gamma$. In this case, since the ratio $\gamma = 1$, the edge emphasis correction amount $\epsilon l = \epsilon$.

On the other hand, if the determination signal KC indicates a chromatic color (No in step S1), it is checked in step S2 if the chromaticness signal S is higher than a predetermined threshold value $\eta$. This step checks the vividness of the pixel of interest. If the chromaticness level of the pixel of interest is higher than the predetermined threshold value $\eta$ (YES in step S2), the ratio $\gamma$ for a full edge emphasis amount $\epsilon$ to an edge emphasis correction amount $\epsilon l$ is set at "0" in step S6. In step S4, the edge emphasis correction amount $\epsilon l = \gamma \epsilon$ is calculated using the set ratio $\gamma$. In this case, since the ratio γ=0, the edge emphasis correction amount εl=0. This means that no edge correction is performed for the lightness signal L1. Such processing is made based on empirical rules that a pixel with a high chromaticness level can have a higher edge effect if lightness is maintained to stress chromaticness.

On the other hand, if the pixel of interest has a chromaticness level lower than the predetermined threshold value η but is too high to be determined as an achromatic color (NO in step S2), in step S3 values are continuously plotted between the ratio γ=0 and the ratio γ=1 using a predetermined threshold value α in accordance with the following equation (6):

$$\gamma = (1-(S-\alpha)/(\eta-\alpha)) \quad (6)$$

Furthermore, in step S4, the edge emphasis correction amount εl for the chromaticness signal is calculated using the following equation (6a):

$$\gamma l = (1-(S-\alpha)/(\eta-\alpha))\epsilon \quad (6a)$$

Figure 14:
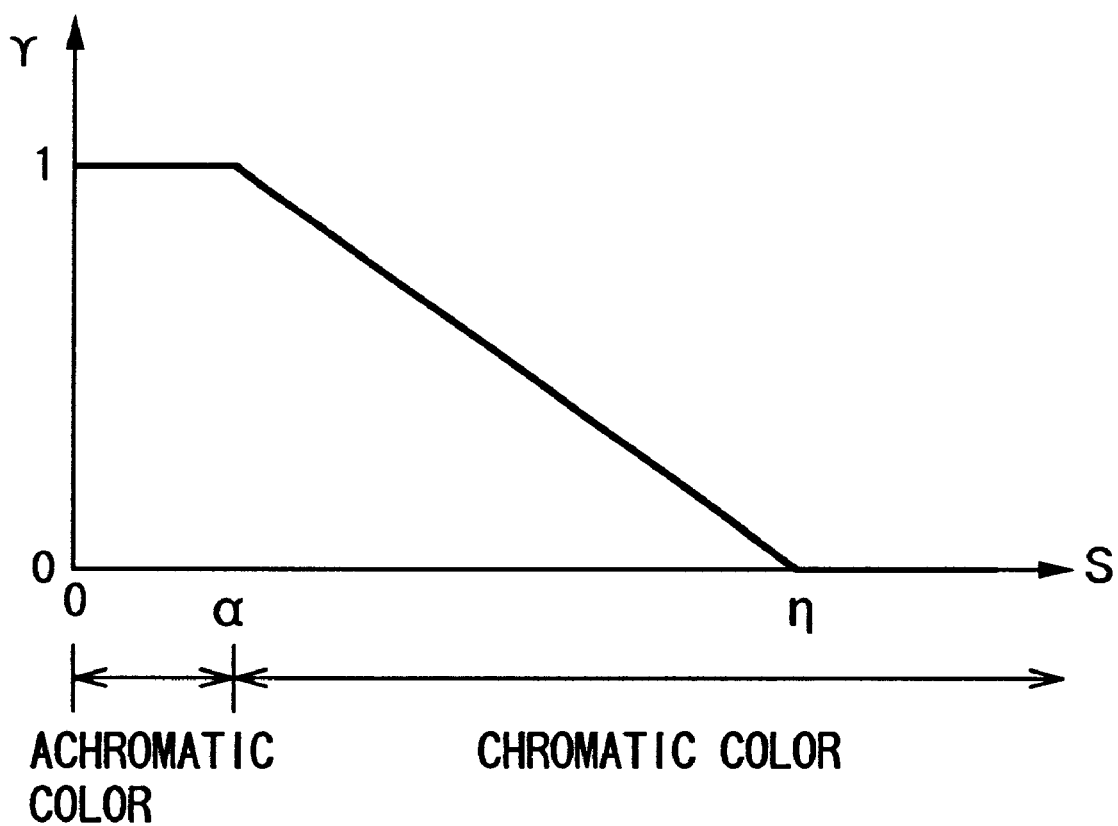
FIG. 14 is a graph showing the edge emphasis correction amount for a lightness signal by the edge emphasis amount distribution unit according to the second embodiment.

FIG. 14 shows the relationship between the ratio γ and the chromaticness signal S. As shown in FIG. 14, the abscissa plots the chromaticness signal S, and the ordinate plots the ratio γ. When the chromaticness signal S falls within the range from 0 to a chromaticness value (threshold value α) at which it is determined as an achromatic color, the edge emphasis correction amount εl=ε is set, and the ratio γ=1. When the chromaticness signal S falls within the range between the threshold values α and η, the ratio γ continuously decreases in accordance with the ratio γ=(1−(S−α)/(η−α)) as the chromaticness becomes higher. When the chromaticness signal S is higher than the threshold value η, the edge emphasis correction amount εl=0, and γ=0.

The edge emphasis correction amount εc for the chromaticity signals (Ca1, Cb1) is explained below. As for the chromaticity signals (Ca1, Cb1), contrary to the lightness signal in principle, as the chromaticness is higher (vividness is higher), a larger edge emphasis amount ε is distributed to each of the chromaticity signals (Ca1, Cb1). Also, no edge correction is performed for an achromatic color signal pixel, and the chromaticity signals of the pixel of interest are removed at that time. This is because, in an image processing apparatus such as a color copying machine, any residual color components in copied images such as black characters or the like result in visually very poor image quality. Hence, such pixels must be color-corrected to completely achromatic color signals by cutting their chromatic components.

Figure 15:
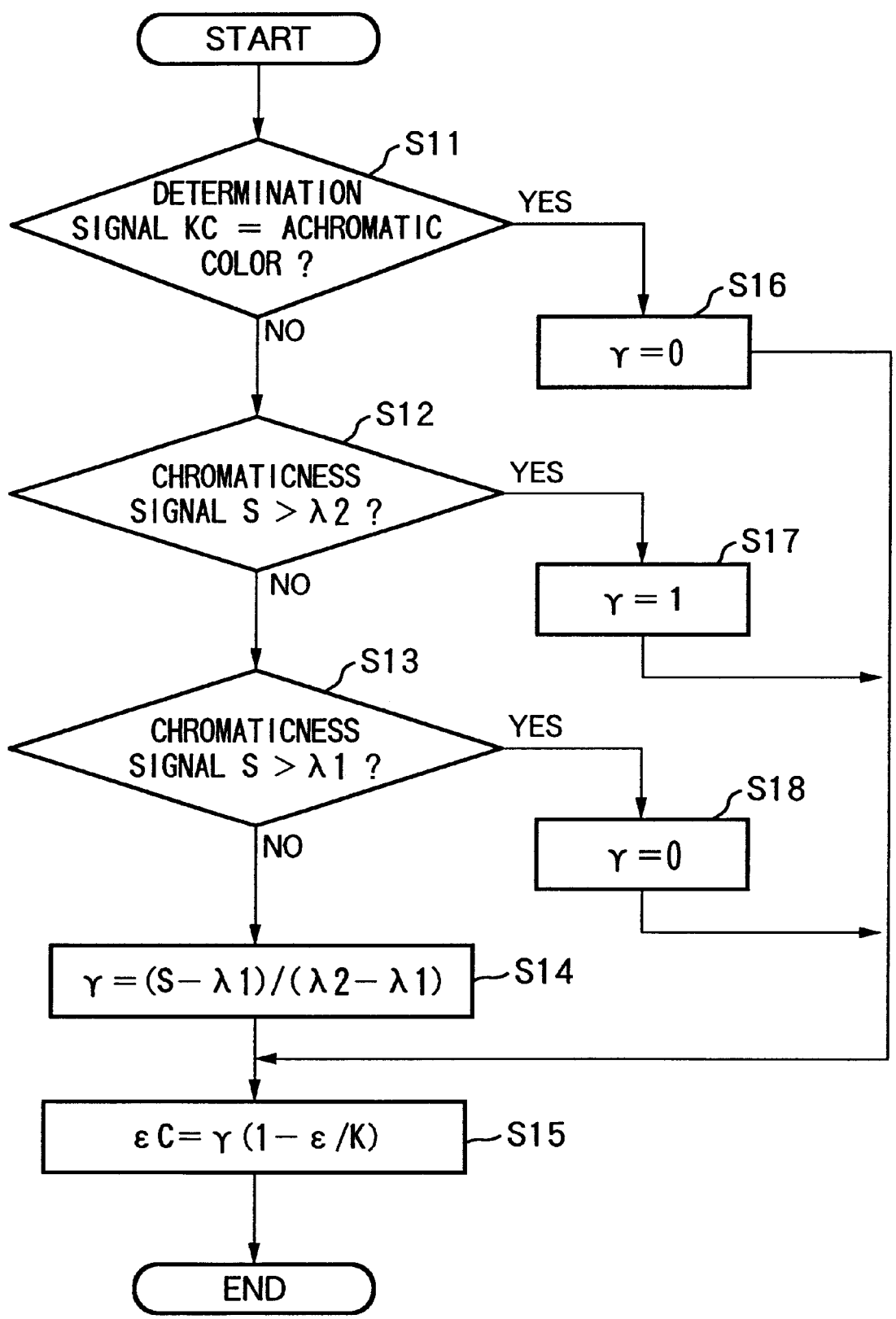
FIG. 15 a flow chart showing the edge emphasis correction amount generation for a chromaticity signal by the edge emphasis amount distribution unit according to the second embodiment.

This mechanism is explained below with the aid of the flow chart in FIG. 15 and the graph in FIG. 16.

In step S11, it is checked in accordance with the achromatic color/chromatic color determination signal KC if the pixel of interest is an achromatic color pixel. If the determination signal KC indicates an achromatic color (YES in step S11), the flow advances to step S16, the ratio γ for assigning a full edge emphasis amount ε to an edge emphasis correction amount cc is set at "0". In step S15, the edge emphasis correction amount εl=γε is calculated using the set ratio γ. In this case, since the ratio γ=0, the edge emphasis correction amount εl=0.

On the other hand, if the determination signal KC indicates a chromatic color (NO in step S11), it is checked in step S12 if the chromaticness signal S is higher than a predetermined threshold value λ2. If the pixel of interest has a chromaticness level higher than the predetermined threshold value λ2 (YES in step S12), the ratio γ for assigning a full edge emphasis amount ε to an edge emphasis correction amount εc is set at "1" in step S17. In step S15, the edge emphasis correction amount εl=γε is calculated using the set ratio γ. In this case, since the ratio γ=1, the edge emphasis correction amount εl=ε.

On the other hand, if the pixel of interest has a chromaticness level lower than the predetermined threshold value λ2 (NO in step S12), it is checked in step S13 if the chromaticness signal S is lower than a predetermined threshold value λ1 (λ2>λ1). If the pixel of interest has a chromaticness level lower than the predetermined threshold value λ1 (YES in step S13), the flow advances to step S18 to set the ratio γ for assigning a full edge emphasis amount ε to an edge emphasis correction amount εc at "0". In step S15, the edge emphasis correction amount εl=γε is calculated using the set ratio γ. In this case, since the ratio γ=0, the edge emphasis correction amount εl=0.

On the other hand, if the pixel of interest has a chromaticness level which is lower than the predetermined threshold value λ2 and higher than the predetermined threshold value λ1 and is too high to be determined as an achromatic color (NO in step S13), values are continuously plotted between the ratio γ=0 and the ratio γ=1 using the predetermined threshold value λ1 in accordance with the following equation (7), in step S14:

$$\gamma = (S-\lambda 1)/(\lambda 2-\lambda 1) \quad (7)$$

Furthermore, the edge emphasis correction amount εc for the chromaticity signals (Ca1, Cb1) is obtained by the following equation (8):

$$\epsilon c = \gamma (1-\epsilon/k) \quad (8)$$

Figure 16:
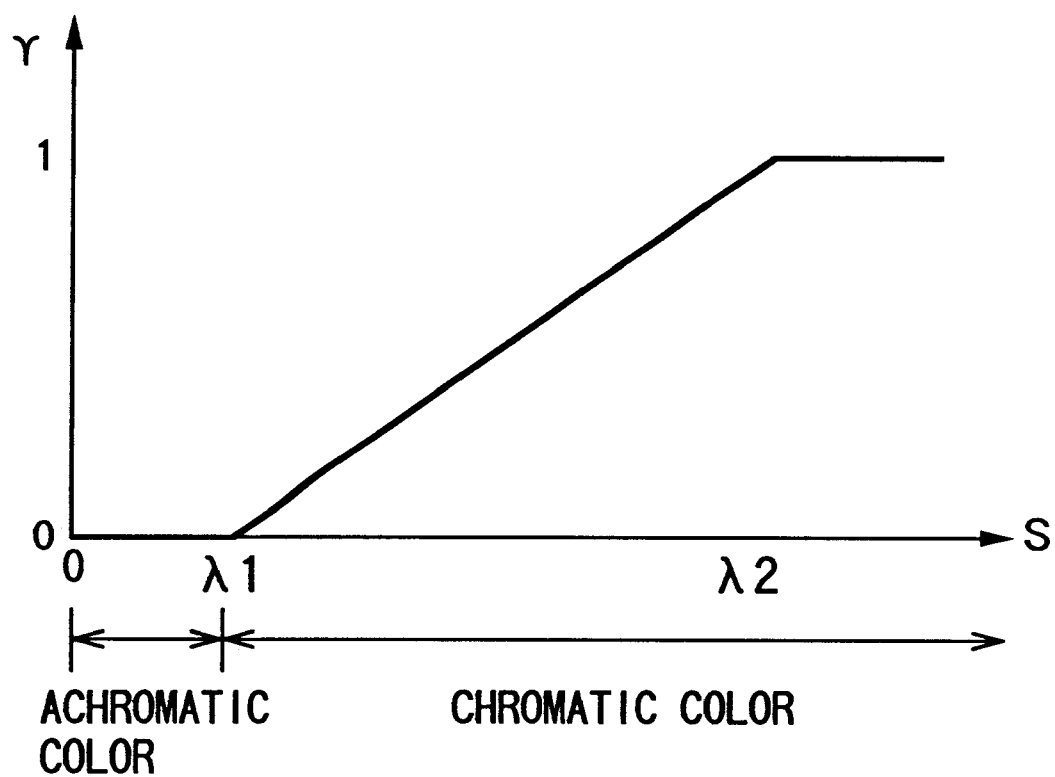
FIG. 16 is a graph showing the edge emphasis correction amount for a chromaticity signal by the edge emphasis amount distribution unit according to the second embodiment.
Figure 17:
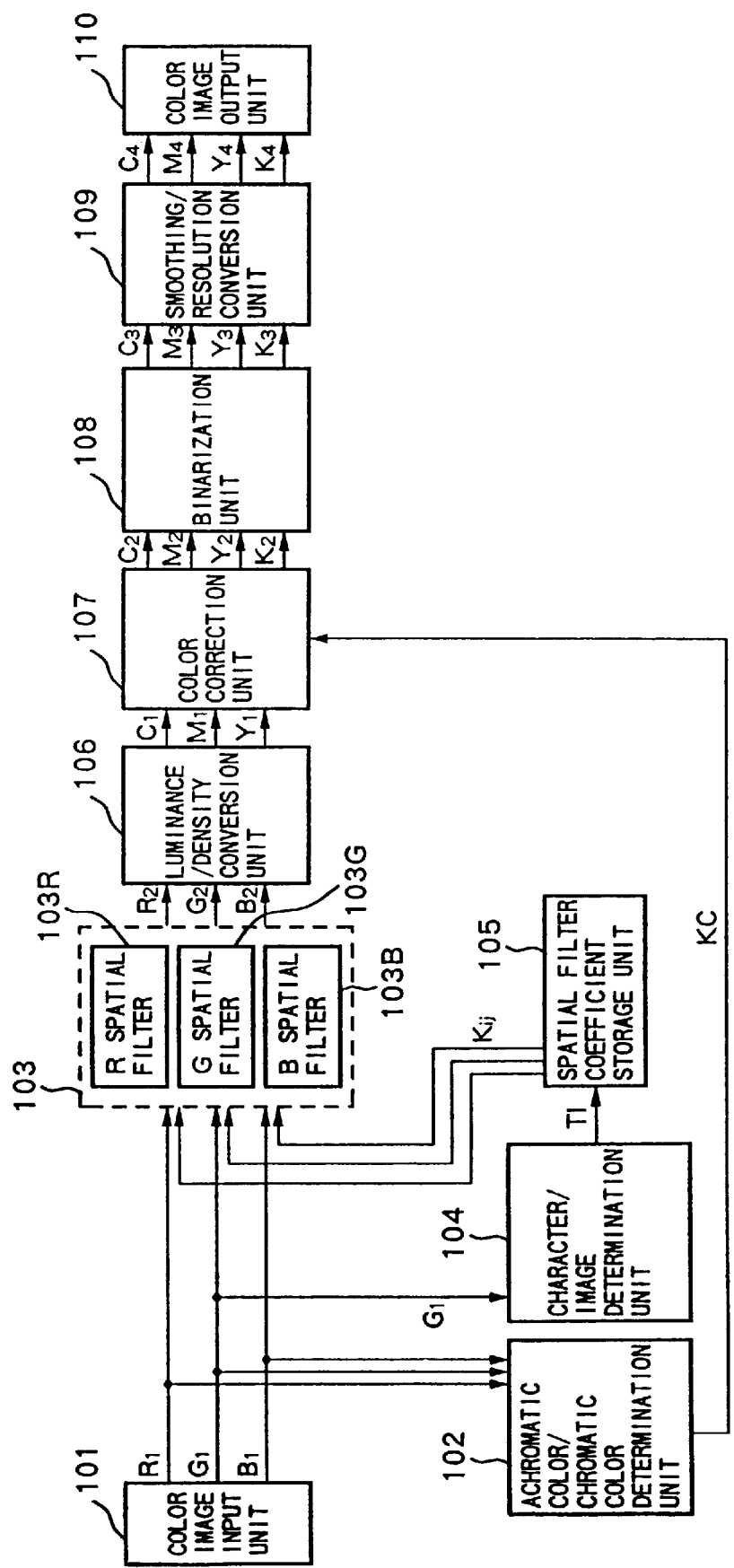
FIG. 17 is a block diagram showing the arrangement of a conventional color image processing apparatus.

FIG. 16 shows the relationship between the ratio γ and the chromaticness signal S. As shown in FIG. 16, the abscissa plots the chromaticness signal S, and the ordinate plots the ratio γ. When the chromaticness signal S falls within the range from 0 to a chromaticness value (threshold value λ1) at which it is determined as an achromatic color, the edge emphasis correction amount εl=0 and the ratio γ=0. When the chromaticness signal S falls within the range between the threshold values λ1 and λ2, the ratio γ continuously increases in accordance with the ratio γ=(S−λ1)/(λ2−λ1) as the chromaticness becomes higher. When the chromaticness signal S is higher than the threshold value λ2, the edge emphasis correction amount εl=1, and γ=1.

The edge emphasis correction amounts εl and εc generated as described above are input to the edge emphasis unit 502 together with the lightness signal L1 and chromaticity signals (Ca1, Cb1). The unit 502 adds the edge emphasis correction amount εl to the lightness signal L1, and multiplies the chromaticity signals Ca1 and Cb1 by the edge emphasis correction amount εc:

L2=εl+L1

Ca2=εc*Ca1

$$Cb2 = \epsilon c * Cb1 \quad (9)$$

As can be seen from equations (9), since edge emphasis correction amount εl is added to the lightness signal L1, lightness is preserved (εl=0) in a pixel in which the chromaticness level is high and its lightness signal is not to be edge-emphasized.

On the other hand, since the chromaticity signals (Ca1, Cb1) are multiplied by the edge emphasis correction amount εc, the chromaticity components themselves of the pixel of interest can be removed by multiplying a pixel that can be determined to be an achromatic pixel by εc=0.

The edge-emphasized lightness signal L2 and chromaticity signals (Ca2, Cb2) are input to a second color space conversion unit 503, and are inversely converted into R, G, and B signals again.

Equations (10) are an example of conversion formulas for converting the lightness and chromaticity signals L2, Ca2, and Cb2 into three color-separated signals R2, G2, and B2, and are inverse conversion coefficients of equations (2):

$$R2=(4L2+5Ca2+2Cb2)/4$$
$$G2=(4L2-3Ca2+2Cb2)/4$$
$$B2=(4L2+Ca2-6Cb2)/4 \quad (10)$$

Thereafter, as in the above-mentioned prior art, the three color-separated signals R2, B2, and G2 inversely converted into R, G, and B signals are input to the luminance/density conversion unit 106, and are converted into density signals C1, M1, and Y1. The density signals C1, M1, and Y1 are subjected to color processing such as generation of a black signal K, undercolor removal, color correction, and the like by the color correction unit 107 to output density signals C2, M2, Y2, and K2. In this embodiment, the determination signal KC as the determination result of the achromatic color/chromatic color determination unit 506, and the determination signal TI as the determination result of the character/image determination unit 104 are input to a black character/color character/image determination unit 508. The black character/color character/image determination unit 508 outputs a black character/color character/image determination signal TC to the color correction unit 107, which performs color correction in accordance with the determination signal TC. For example, color correction that places an importance on the color reproducibility of a highlight portion may be performed for an image signal of image data, and color correction without highlight reproduction with the undercolor being removed may be performed for color and black character signals.

Finally, the binarization unit 108 and the smoothing/resolution conversion unit 109 execute their processing with reference to the determination signal TI as the determination result of the character/image determination unit 104, and the color image output unit 110 records a color image.

As described above, according to the second embodiment, when it is determined by the pre-scan that the original is a monochrome original, since a plurality of spatial filters prepared for a color original are used for the monochrome original, the filter region in the spatial filter processing for the monochrome original can be broadened without increasing cost. Steeper filter characteristics can be obtained, and the spatial frequency corresponding to a maximum gain can be shifted toward the lower-frequency side. Furthermore, the degree of freedom in setting the spatial filter can be increased, and a spatial filter with an improved edge emphasis effect and moiré removal effect can be realized without increasing cost.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores program codes corresponding to the above-mentioned flow charts. This is briefly described below. That is, the storage medium stores modules shown in a memory map example of FIG. 20 or 21.

Figure 20:
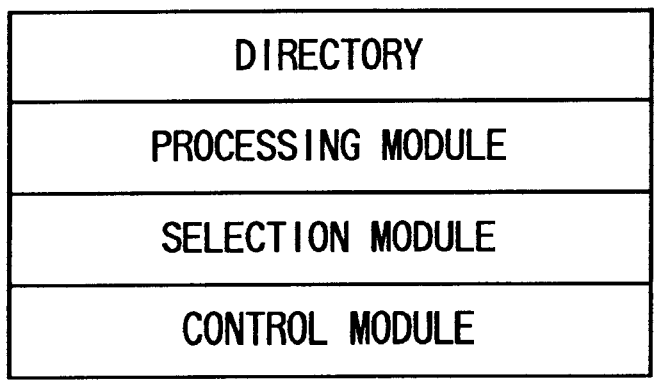
FIG. 20 shows the memory map architecture of a storage medium that stores program codes for realizing an embodiment of the present invention.

More specifically, in the first embodiment, the storage medium need only store program codes of at least a "processing module", "selection module", and "control module" shown in FIG. 20.

Note that the "processing module" executes a plurality of processing steps that can be parallelly processed in units of component data of image data which is made up of a plurality of component data. The "selection module" selects whether the input image data is to be processed as a monochrome or color image. The "control module" controls to execute processing based on the plurality of processing steps for the image data stepwise when it is selected that the input image data is processed as a monochrome image.

Figure 21:
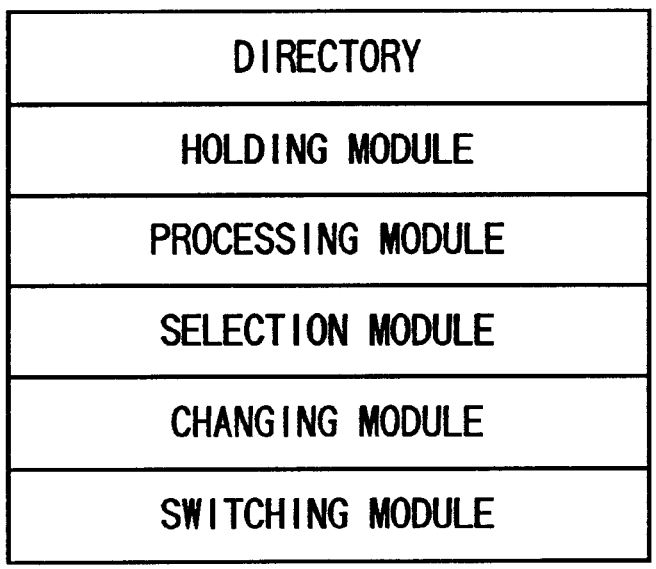
FIG. 21 shows the memory map architecture of a storage medium that stores program codes for realizing an embodiment of the present invention.

In the second embodiment, as shown in FIG. 21, the storage medium need only store program codes of at least a "holding module", "processing module", "selection module", "changing module", and "switching module". Note that the "holding module" holds each component data of image data which is made up of a plurality of component data in a predetermined size. The "processing module" executes processing for the held predetermined component data on the basis of the size of the held component data. The "selection module" selects whether the input image data is to be processed as a monochrome or color image. The "changing module" changes the size of the predetermined component data to be held on the basis of the selection result. The "switching module" switches processing for the predetermined component data held in the changed size to that corresponding to the changed size.

In the above-mentioned embodiments, a copying machine having an image reader unit has been exemplified. Also, the present invention may be applied to a printer or printer controller which has no reader unit.

The present invention is not limited to automatic color/monochrome original determination by the pre-scan. For example, the user may manually select whether the input image data is to be processed as a color or monochrome image, and the method of using the processing means or delay means may be switched in correspondence with the selection result. Also, as described above, not all the plurality of parallel processing means need always be serially connected, but some of the processing means may be serially connected.

In the above-mentioned embodiment, an edge emphasis filter has been exemplified. Also, the present invention may be applied to other processing operations such as a smoothing filter.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus, comprising:

a plurality of processing means for processing image data;

selection means for selecting whether the image data is to be processed as a monochrome image or a color image; and control means for controlling to connect said plurality of processing means in a first configuration when said selection means selects that the image data is to be processed as a color image, and to connect said plurality of processing means in a second configuration when said selection means selects that the image data is to be processed as a monochrome image, said first configuration being one in which said plurality of processing means are in parallel with each other, and said second configuration being one in which said plurality of processing means are in series with each other.

2. An image processing apparatus, comprising:

a plurality of processing means for processing image data;

selection means for selecting whether the image data is to be processed as a monochrome image or a color image; and control means for controlling said apparatus to connect said plurality of processing means when said selection means selects that the image data is to be processed as a color image, and to connect said plurality of processing means with each other when said selection means selects that the image data is to be processed as a monochrome image, wherein said selection means determines on the basis of color component data of the image data if the image data is a monochrome image or a color image, and makes a selection on the basis of the determination result.

3. At The apparatus according to claim 1, wherein said plurality of processing means correct spatial frequency characteristics of the image data.

4. An image processing apparatus, comprising:

selection means for selecting whether image data representing an image is to be processed as a monochrome image or a color image;

holding means for holding image data corresponding to an area in a first size of said image when said selection means selects that the image is to be processed as a color image, and image data corresponding to a second size larger than the first size when said selection means at the image data is to be processed as a monochrome image; and processing means for processing using image data corresponding to a size held by said holding means.

5. The apparatus according to claim 4, wherein said processing corrects spatial frequency characteristics of the image data by shifting a frequency corresponding to a maximum gain of MTF characteristics of the image data toward a lower-frequency side.

6. The apparatus according to claim 4, wherein said selection means calculates a chromaticness signal on the basis of a chromaticity signal of the image data, determines if the image data is a monochrome or color image, and makes a selection on the basis of the determination result.

7. An image processing apparatus comprising:

generation means for generating a lightness signal and a chromaticity signal associated with an input image; and first and second delay means which can be used for respectively delaying the lightness signal and chromaticity signal, wherein when the input image is to be processed as a monochrome image, both said first and second delay means are used for delaying the lightness signal.

8. An image processing method, comprising:

a plurality of processing steps of processing image data with a single set of processing means, wherein each processing means performs at least one of said processing steps;

a selection step of selecting whether the image data is to be processed as a monochrome image or a color image; and a control step of controlling said method to perform the plurality of processing steps in parallel with the single set of processing means so that each processing means performs at least one of said processing steps for each of a plurality of color components of the image data when it is selected in the selection step that the image data is to be processed as a color image, and to perform the plurality of processing steps for the image data stepwise with the single set of processing means so that each processing means performs at least one of said processing steps when it is selected in the selection step that the image data is to be processed as a monochrome image.

9. An image processing method, comprising:

a plurality of processing steps of processing image data;

a selection step of selecting whether the image data is to be processed as a monochrome image or a color image; and a control step of controlling to process in the plurality of processing steps for a plurality of color components of the image data when it is selected in the selection step that the image data is to be processed as a color image, and to process in the plurality of processing steps for the image data stepwise when it is selected in the selection step that the image data is to be processed as a monochrome image, wherein the selection step includes a step of generating a histogram of color component data of the image data, determining based on the generated histogram if the image data is a monochrome or color image, and making a selection based on the determination result.

10. An image processing method, comprising:

a plurality of processing steps of processing image data;

a selection step of selecting whether the image data is to be processed as a monochrome image or a color image; and a control step of controlling to process in the plurality of processing steps for a plurality of color components of the image data when it is selected in the selection step that the image data is to be processed as a color image, and to process in the plurality of processing steps for the image data stepwise when it is selected in the selection step that the image data is to be processed as a monochrome image, wherein the plurality of processing steps include a step of correcting spatial frequency characteristics of the image data.

11. An image processing method, comprising:

a selection step of selecting whether the image data representing an image is to be processed as a monochrome image or a color image; and a processing step of processing using image data corresponding to an area in a first size of said image when said selection step selects that the image data is to be processed as a color image, and image data corresponding to an area in a second size larger than the first size when said selection step selects that the image data is to be processed as a monochrome image.

12. The method according to claim 11, wherein the processing step includes a step of correcting spatial frequency characteristics of the image data by shifting a frequency corresponding to a maximum gain of MTF characteristics of the image data toward a lower-frequency side.

13. The method according to claim 11, wherein the selection step includes a step of calculating a chromaticness signal on the basis of a chromaticity signal of the image data, determining if the image data is a monochrome or color image, and making a selection on the basis of the determination result.

14. An image processing method comprising:

a generation step of generating a lightness signal and a chromaticity signal associated with an input image; and a first and second delay steps which can be used for respectively delaying the lightness signal and chromaticity signal, wherein when the input image is to be processed as a monochrome image, both the first and second delay steps are used for delaying the lightness signal.

15. A computer readable memory that stores program codes of image processing, comprising:

a program code of a plurality of processing steps of processing image data with a single set of processing means, wherein each processing means performs at least one of said processing steps;

a program code of a selection step of selecting whether input image data is to be processed as a monochrome image or a color image; and a program code of a control step of controlling to perform the plurality of processing steps in parallel with the single set of processing means so that each processing means performs at least one of said processing steps for each of a plurality of color components of the image data when it is selected in the selection step that the image data is to be processed as a color image, and to perform the plurality of processing steps for the image data stepwise with the single set of processing means so that each processing means performs at least one of said processing steps when it is selected in the selection step that the image data is to be processed as a monochrome image.

16. A computer readable memory that stores program codes of image processing, comprising:

a program code of a selection step of selecting whether image data representing an image is to be processed as a monochrome image or a color image; and a program code of the processing step of processing using image data corresponding to an area in a first size of said image when said selection step selects that the image data is to be processed as a color image, and using image data corresponding to an area in a second size larger than the first size when said selection step selects that the image data is to be processed as a monochrome image.

17. The apparatus according to claim 1, wherein, when said plurality processing means are controlled to connect serially by said controlling means, executes processing combining with a plurality of characteristics for said image data.

18. An image processing apparatus, comprising:

a plurality of processing means for processing image data;

selection means for selecting whether the image data is to be processed as a monochrome image or a color image; and control means for controlling to connect said plurality of processing means when said selection means selects that the image data is to be processed as a color image, and to connect said plurality of processing means when said selection means selects that the image data is to be processed as a monochrome image, wherein processings executed by said plurality of processing means are a smoothing processing and an edge emphasis processing.

19. The apparatus according to claim 1, wherein said image data is inputted by a reader unit of a scanner.

20. The apparatus according to claim 1, wherein said image data is inputted by an image input unit of a computer.

21. The apparatus according to claim 1, further comprising, output means for outputting image data processed by said plurality of processing means.

22. An image apparatus comprising:

a plurality of line memories holding image data;

selection means for selecting whether the image data is to be processed as a monochrome image or a color image; and controlling means for controlling a connection condition of the plurality of line memories on the basis of a selection result of said selection means.

23. The apparatus according to claim 22, wherein said selection means determines on the basis of color component data of the image data if the image data is a monochrome image or a color image, and makes a selection on the basis of the determination result.

24. The apparatus according to claim 22, further comprising, processing means for correcting spatial frequency characteristics of the image data held by said plurality of line memories.

25. The apparatus according to claim 24, wherein processing executed by said processing means are a smoothing processing and an edge emphasis processing.

26. The apparatus according to claim 22, wherein said image data is inputted by a reader unit of a scanner.

27. The apparatus according to claim 22, wherein said image data is inputted by an image input unit of a computer.

28. The apparatus according to claim 24, further comprising, output means for outputting image data processed by said processing means.

29. An image processing apparatus comprising:

a plurality of filtering processing means for executing processing of image data;

selection means for selecting whether the image data is to be processed as a monochrome image or a color image; and control means for controlling to connect said plurality of filtering processing means in a first configuration and execute a filtering processing for the image data when said selection means selects that the image data is to be processed as a color image, and to connect said plurality of filtering processing means in a second configuration and execute a plurality of filtering processing for the image data when said selection means selects that the image data is to be processed as a monochrome image, said first configuration being one in which said plurality of filtering processing means are in parallel with each other, and said second configuration being one in which said plurality of filtering processing means are in series with each other.

30. The apparatus according to claim 4, wherein said holding means is line memories.

31. The apparatus according to claim 30, wherein image data corresponding to area in the second size larger than the first size of the image is held by switching connections of said line memories.

32. The apparatus according to claim 4, wherein said image data is inputted by a reader unit of a scanner.

33. The apparatus according to claim 4, wherein said image data is inputted by an image input unit of a computer.

34. The apparatus according to claim 4, further comprising, output means for output image data processed by said processing means.

35. An image processing apparatus, comprising:

selection means for selecting whether image data representing an image is to be processed as a monochrome image or a color image;

holding means for holding, on the basis of a selection result of said selection means, image data corresponding to an area in a first size of said image, or image data corresponding to an area in a second size larger than the first size; and processing means for processing using image data corresponding to an area in a size held by said holding means.

36. The apparatus according to claim 35, wherein said processing means corrects spatial frequency characteristics of the image data by shifting a frequency corresponding to a maximum gain of MTF characteristics of the image data toward a lower-frequency side.

37. The apparatus according to claim 35, wherein said selection means calculates a chromaticness signal on the basis of a chromaticity signal of the image data, determines if the image data is a monochrome or color image, and makes a selection on the basis of the determination result.

38. The apparatus according to claim 35, wherein said holding means is line memories.

39. The apparatus according to claim 38, wherein image data corresponding to area in the second size larger than the first size of the image is held by switching connections of said line memories.

40. The apparatus according to claim 35, wherein said image data is inputted by a reader unit of a scanner.

41. The apparatus according to claim 35, wherein said image data is inputted by an image input unit of a computer.

42. The apparatus according to claim 35, further comprising, output means for outputting image data processed by said processing means.

43. The apparatus according to claim 7, further comprising, processing means for executing processing to correct spatial frequency characteristics of image data representing the input image using a signal delayed by said first and second delay means.

44. The apparatus according to claim 7, wherein said first and second means are line memories.

45. The apparatus according to claim 44, said first and second delay means are used for delaying the lightness signal by switching connection line memories.

46. The apparatus according to claim 7, wherein image data representing said input image is inputted by a reader unit of a scanner.

47. The apparatus according to claim 7, wherein image data representing said input image is inputted by an image input unit of a computer.

48. The apparatus according to claim 43, further comprising output means for outputting image data processed by said processing means.

49. An image processing apparatus comprising:

generation means for generating image data including first and second component data;

first and second delay means for delaying the first and second component data, respectively; and wherein when the image data is to be processed as a monochrome image, said first and second delay means are used for delaying the first component data.

50. The apparatus according to claim 49, further comprising, processing means for executing processing to correct spatial frequency characteristics of image data representing the input image using a signal delayed by said first and second delay means.

51. The apparatus according to claim 49, wherein said first and second delay means are line memories.

52. The apparatus according to claim 51, said first and second delay means used for delaying the first component data by switching connection of said line memories.

53. The apparatus according to claim 49, wherein image data representing said input image is inputted by a reader unit of a scanner.

54. The apparatus according to claim 49, wherein image data representing said input image is inputted by an image input unit of a computer.

55. The apparatus according to claim 49, further comprising, output means for outputting image data processed by said processing means.

56. A computer readable memory that stores program codes of image processing:

a program code of a generation step of generating a lightness signal and a chromaticity signal associated with an input image; and a program code of first and second delay steps which can be used for respectively delaying the lightness signal and chromaticity signal, wherein when the input image is to be processed as a monochrome image, both the first and second delay steps are used for delaying the lightness signal.

* * * * *

UNITED STATES PATENT AND TRADEMARK OFFICE
CERTIFICATE OF CORRECTION

PATENT NO. : 6,226,397 B1
DATED : May 1, 2001
INVENTOR(S) : Yamagata et al.

It is certified that error appears in the above-identified patent and that said Letters Patent is hereby corrected as shown below:

Column 15,
Line 20, "$\gamma1=(1-(S-\alpha)/(\eta-\alpha))\varepsilon$" should read -- $\varepsilon1=(1-(S-\alpha)/(\eta-\alpha))\varepsilon$ --; and
Line 57, "cc" should read -- $\varepsilon c$ --.

Column 17,
Line 57, "equipments" should read -- equipment --.

Column 19,
Line 34, "said apparatus" should be deleted; and "connect" should read -- connect parallely --;
Line 37, "connect" should read -- connect serially --;
Line 38, "with each other" should be deleted; and
Line 46, "At" should be deleted.

Column 24,
Line 8, "said" should read -- wherein said --.

Signed and Sealed this

Twenty-third Day of July, 2002

Attest:

*Attesting Officer*

JAMES E. ROGAN
*Director of the United States Patent and Trademark Office*